(12) United States Patent
Tanaka

(10) Patent No.: US 8,934,558 B2
(45) Date of Patent: Jan. 13, 2015

(54) RADIO COMMUNICATION SYSTEM, RADIO TERMINAL, RADIO BASE STATION, CONTROL DEVICE AND RADIO COMMUNICATION METHOD

(75) Inventor: Takanori Tanaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 572 days.

(21) Appl. No.: 13/145,764

(22) PCT Filed: Jan. 22, 2010

(86) PCT No.: PCT/JP2010/050756
§ 371 (c)(1),
(2), (4) Date: Jul. 21, 2011

(87) PCT Pub. No.: WO2010/084936
PCT Pub. Date: Jul. 29, 2010

(65) Prior Publication Data
US 2011/0280330 A1    Nov. 17, 2011

(30) Foreign Application Priority Data

Jan. 22, 2009 (JP) .................................. 2009-012326
Jan. 28, 2009 (JP) .................................. 2009-017397

(51) Int. Cl.
| | |
|---|---|
| *H04B 7/02* | (2006.01) |
| *H04L 1/02* | (2006.01) |
| *H04W 72/04* | (2009.01) |
| *H04W 72/08* | (2009.01) |

(52) U.S. Cl.
CPC ........... *H04B 7/024* (2013.01); *H04W 72/0426* (2013.01); *H04W 72/046* (2013.01); *H04W 72/082* (2013.01)
USPC .......................................... 375/267; 455/132

(58) Field of Classification Search
None
See application file for complete search history.

(56) References Cited

U.S. PATENT DOCUMENTS

| | | | |
|---|---|---|---|
| 2001/0003443 A1* | 6/2001 | Velazquez et al. ............ | 342/367 |
| 2009/0061786 A1 | 3/2009 | Malik et al. | |

(Continued)

FOREIGN PATENT DOCUMENTS

| | | |
|---|---|---|
| JP | 2003-008494 A | 1/2003 |
| JP | 2003-115792 A | 4/2003 |

(Continued)

OTHER PUBLICATIONS

International Search Report and Written Opinion dated Mar. 23, 2010 issued by the Japanese Patent Office for International Application No. PCT/JP2010/050756.

(Continued)

*Primary Examiner* — Kabir A Timory
*Assistant Examiner* — Gina McKie
(74) *Attorney, Agent, or Firm* — Procopio, Cory, Hargreaves & Savitch LLP

(57) ABSTRACT

A radio communication system comprises a control device that controls a radio station, which uses a plurality of first transmission antennas to transmit a first radio signal, for which a channel A is used, to a radio terminal, and a radio station, which uses a plurality of second transmission antennas to transmit a second radio signal, for which the channel A is used, to a radio terminal. The radio terminal, if having received the second radio signal, transmits, to the radio station, interference information based on the arrival direction from which the second radio signal comes to the radio terminal. Based on the interference information received by the radio base station, the control device transmits, to the radio station, control information to be used for directing, in the arrival direction, the null point of a directional beam formed by the second transmission antennas.

25 Claims, 23 Drawing Sheets

(56) References Cited

U.S. PATENT DOCUMENTS

| | | | |
|---|---|---|---|
| 2009/0257312 A1* | 10/2009 | Novick et al. | 367/119 |
| 2010/0248734 A1* | 9/2010 | Yamazaki et al. | 455/452.2 |

FOREIGN PATENT DOCUMENTS

| | | |
|---|---|---|
| JP | 2004-297483 A | 10/2004 |
| JP | 2007-312205 A | 11/2007 |
| JP | 2008-160380 A | 7/2008 |
| JP | 2008-536342 A | 9/2008 |
| JP | 2008-236222 A | 10/2008 |
| JP | 2008-252359 A | 10/2008 |

OTHER PUBLICATIONS

Notification of Reasons for Refusal dated Dec. 11, 2012 issued in counterpart Japanese Application No. 2009-017397.
Notification of Reasons for Refusal dated Dec. 11, 2012 issued in counterpart Japanese Application No. 2009-012326.

* cited by examiner

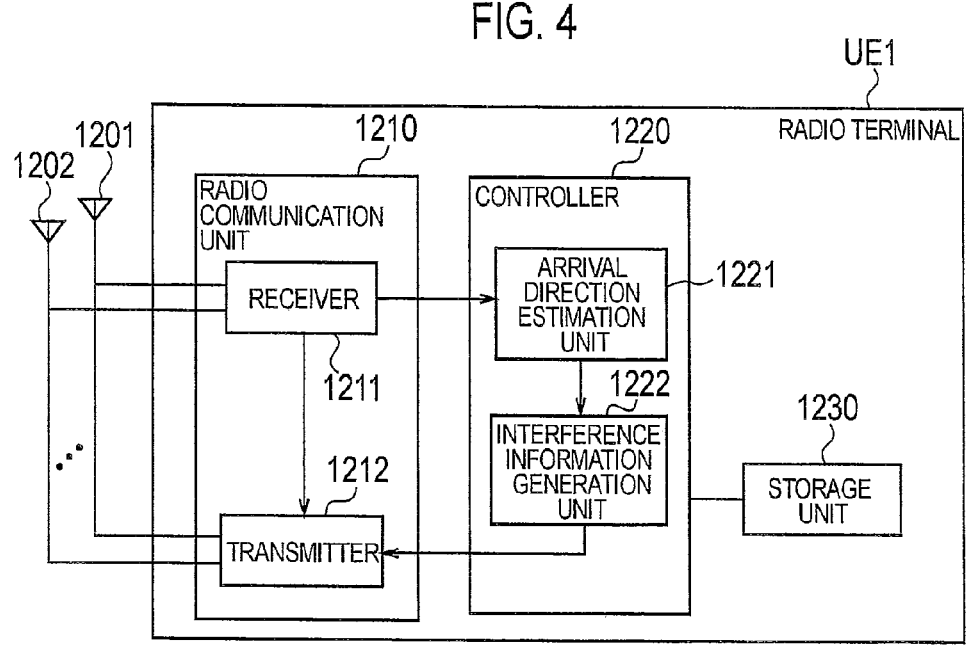
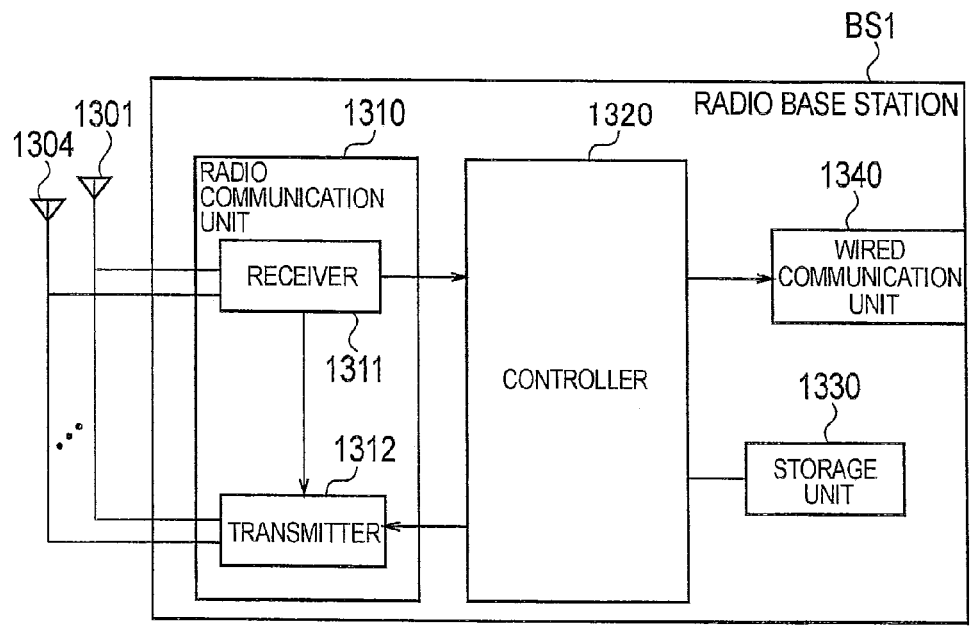

RADIO COMMUNICATION SYSTEM, RADIO TERMINAL, RADIO BASE STATION, CONTROL DEVICE AND RADIO COMMUNICATION METHOD

TECHNICAL FIELD

The present invention relates to a radio communication system, a radio terminal, a radio base station, a control device and a radio communication method, all of which uses a multiple-antenna technique.

BACKGROUND ART

In recent years, for efficiently utilizing a limited frequency band, radio communication systems have been using multiple-antenna techniques with which at least one of a transmission side and a reception side uses multiple antennas. One of known multiple-antenna techniques is for multiple-input multiple-output (MIMO) communications in which multiple signal sequences using the same frequency are simultaneously transmitted via multiple transmission antennas and then received via multiple reception antennas, and then, the received signal sequences are demultiplexed from each other.

The MIMO communications include a scheme in which the reception side estimates propagation channel characteristics between the reception side and the transmission side and then feeds back feedback information based on the estimated propagation channel characteristics to the transmission side (so called, closed loop MIMO). The transmission side performs various types of transmission control, e.g., weighting on each of the transmission antennas. With the closed loop MIMO, the communication quality can be improved because the transmission side can perform transmission control adapted to a change in the propagation channel characteristics.

PRIOR ART DOCUMENT

Patent Document

PATENT DOCUMENT 1: Published Japanese Translation of PCT International Application No. 2008-536342

SUMMARY OF THE INVENTION

In recent years, however, there have been implemented radio communication systems in each of which the same communication channel (the same frequency, to be more specific) are used by neighboring cells for more efficiently using the frequency band.

In the downlink communications in such radio communication systems, a radio terminal serving as the reception side of radio signals sometimes receives not only a desired signal from a radio base station to which the radio terminal is connected, but also an interference signal from a different radio base station located around the radio terminal.

In the aforementioned closed loop MIMO, however, closed feedback control is performed between the transmission side and the reception side. For this reason, there has been a problem that the communication quality cannot be improved sufficiently in the case where the radio terminal receives the interference signal.

In the uplink communications in the radio communication systems described above, a radio base station serving as the reception side of radio signals sometimes receives not only a desired signal from a radio terminal connected to the radio base station, but also an interference signal from a radio terminal connected to a different radio base station located around the radio base station.

In the aforementioned closed loop MIMO, however, closed feedback control is performed between the transmission side and the reception side. For this reason, there has been a problem that the communication quality cannot be improved sufficiently in the case where the radio base station receives the interference signal.

In this respect, a first objective of the present invention is to provide a radio communication system, a radio terminal, a control device and a radio communication method with which the communication quality can be improved sufficiently even in a case where a radio terminal receives an interference signal in downlink communications.

Moreover, a second objective of the present invention is to provide a radio communication system, a radio base station, a control device and a radio communication method with which the communication quality can be improved sufficiently even in a case where a radio base station receives an interference signal in uplink communications.

In order to achieve the first objective described above, the present invention has the following features. First of all, according to a first feature of the present invention, there is provided a radio communication system (radio communication system 1010A or 1010B) comprising: a first radio terminal (radio terminal UE1); a first radio base station (radio base station BS1) configured to transmit a first radio signal, for which a predetermined communication channel (channel A) is used, to the first radio terminal via a plurality of first transmission antennas (antennas 1301 to 1304); a second radio base station (radio base station BS2) configured to transmit a second radio signal, for which the predetermined communication channel is used, to a second radio terminal (radio terminal UE5) via a plurality of second transmission antennas (antennas 1401 to 1404); and a control device (control device 1100A or 1100B) configured to control the first radio base station and the second radio base station, wherein upon receipt of the second radio signal from the second radio base station, the first radio terminal estimates an arrival direction (arrival direction D1) of the second radio signal to the first radio terminal and then transmits, to the first radio base station, interference information based on the estimated arrival direction, and the control device transmits control information to the second radio base station on the basis of the interference information received by the first radio base station, the control information being for directing, toward the first radio terminal, a null point of a directional beam formed by the second transmission antennas.

In a case where the first radio terminal receives the second radio signal (i.e., interference signal) from the second radio base station, the aforementioned radio communication system can direct the null point of the second radio base station to the first radio terminal. Thus, the first radio terminal can avoid receiving the second radio signal, and the communication quality in the first radio terminal can be improved sufficiently.

A second feature of the present invention relates to the first feature of the present invention, and is summarized as follows. The second radio base station transmits the second radio signal while directing the null point toward the first radio terminal and also directing the directional beam toward the second radio base station on the basis of the control information received from the control device and feedback information fed back from the second radio terminal.

A third feature of the present invention relates to the first feature of the present invention, and is summarized as follows. The control device is included in the first radio base station.

A fourth feature of the present invention relates to the first feature of the present invention, and is summarized as follows. The control device is provided separately from the first radio base station and the second radio base station.

A fifth feature of the present invention relates to the first feature of the present invention, and is summarized as follows. The first radio terminal transmits, to the first radio base station, base station identification information for identifying the second radio base station on the basis of the second radio signal, and the control device identifies the second radio base station from among a plurality of radio base stations on the basis of the base station identification information received by the first radio base station, and the control device transmits the control information to the identified second radio base station.

A sixth feature of the present invention relates to the first feature of the present invention, and is summarized as follows. The control device previously holds therein correspondence information associating the interference information with the second radio base station, the control device identifies the second radio base station from among a plurality of radio base stations on the basis of the interference information received by the first radio base station, and the correspondence information held therein, and the control device transmits the control information to the identified second radio base station.

A seventh feature of the present invention relates to the first feature of the present invention, and is summarized as follows. The interference information is information indicating the arrival direction estimated by the first radio terminal, or information for identifying a transmission antenna weight for directing the null point toward the first radio terminal.

An eighth feature of the present invention relates to the first feature of the present invention, and is summarized as follows. The control information is information indicating the arrival direction estimated by the first radio terminal, or information for identifying a transmission antenna weight for directing the null point toward the first radio terminal.

According to a ninth feature of the present invention, there is provided a radio terminal (radio terminal UE1) comprising: a receiver (receiver 1211) configured to receive a first radio signal from a first radio base station configured to transmit, via a plurality of transmission antennas (antennas 1301 to 1304), the first radio signal for which a predetermined communication channel (channel A) is used; an arrival direction estimation unit (arrival direction estimation unit 1221) configured to, if the receiver receives a second radio signal, for which the predetermined communication channel is used, from a second radio base station (radio base station BS2), estimate an arrival direction (arrival direction D1) of the second radio signal to the radio terminal; and a transmitter (transmitter 212) configured to transmit, to the first radio base station, interference information based on the arrival direction estimated by the arrival direction estimation unit.

According to a tenth feature of the present invention, there is provided a control device (control device 1100A or 1100B) configured to control: a first radio base station (radio base station BS1) configured to transmit a first radio signal, for which a predetermined communication channel (channel A) is used, to a first radio terminal (radio terminal UE1) via a plurality of first transmission antennas (antennas 1301 to 1304); and a second radio base station (radio base station BS2) configured to transmit a second radio signal, for which the predetermined communication channel is used, to a second radio terminal via a plurality of second transmission antennas (antennas 1401 to 1404), the control device comprising a transmitter (transmitter 1112) configured to transmit control information to the second radio base station on the basis of interference information based on an arrival direction of the second radio signal to the first radio terminal, if the first radio base station receives the interference information from the first radio terminal, the control information being for directing, toward the first radio terminal, a null point of a directional beam formed by the second transmission antennas.

According to an eleventh feature of the present invention, there is provided a radio communication method comprising the steps of: transmitting (step S1101 or S1201), from a first radio base station (radio base station BS1) to a first radio terminal (radio terminal UE1) via a plurality of first transmission antennas (antennas 1301 to 1304), a first radio signal for which a predetermined communication channel (channel A) is used; transmitting (step S1102 or S1202), from a second radio base station (radio base station BS2) to a second radio terminal (radio terminal UE5) via a plurality of second transmission antennas (antennas 1401 to 1404), a second radio signal for which the predetermined communication channel is used; estimating (step S1109a or S1209a) an arrival direction of the second radio signal to the first radio terminal if the first radio terminal receives the second radio signal from the second radio base station; transmitting (step S1111a or S1211a), from the first radio terminal to the first radio base station, interference information based on the arrival direction estimated in the estimation step; and transmitting (step S1115 or S1214) control information, based on the interference information received by the first radio base station, to the second radio base station from a control device configured to control the first radio base station and the second radio base station, the control information being for directing, toward the first radio terminal, a null point of a directional beam formed by the second transmission antennas.

According to a twelfth feature of the present invention, there is provided a radio communication system (radio communication system 2010A or 2010B) comprising: a first radio base station (radio base station BS1 or BS1') configured to receive a first radio signal, for which a predetermined communication channel (channel A) is used, from a first radio terminal (radio terminal UE1) having a plurality of first transmission antennas; a second radio base station (radio base station BS2) configured to receive a second radio signal, for which the predetermined communication channel is used, from a second radio terminal (radio terminal UE4) having a plurality of second transmission antennas (antennas 2401, 2402); and a control device (control device 2100A or 2100B) configured to control the first radio base station and the second radio base station, wherein the first radio base station generates interference information based on an arrival direction (direction D1) of the second radio signal to the first radio base station upon receipt of the second radio signal from the second radio terminal, the control device transmits the interference information generated by the first radio base station to the second radio base station, and upon receipt of the interference information, the second radio base station transmits control information based on the received interference information to the second radio terminal, the control information being for directing, toward the first radio base station, a null point of a directional beam formed by the plurality of second transmission antennas.

In a case where the first radio base station receives the second radio signal (i.e., interference signal) from the second radio terminal, the aforementioned radio communication system can direct the null point of the second radio terminal to the first radio base station. Thus, the first radio base station can avoid receiving the second radio signal, and the communication quality in the first radio base station can be improved sufficiently.

A thirteenth feature of the present invention relates to the twelfth feature of the present invention, and is summarized as follows. The second radio terminal transmits the second radio signal while directing the null point toward the first radio base station and also directing the directional beam toward the second radio base station on the basis of the control information received from the second radio base station and feedback information fed back from second radio base station.

A fourteenth feature of the present invention relates to the twelfth feature of the present invention, and is summarized as follows. The control device includes: a base station identification unit (base station identification unit 2121) configured to identify the second radio base station from among a plurality of radio base stations including the second radio base station, on the basis of information on the second radio signal; and an interference information transmitter (transmitter 2112) configured to transmit the interference information to the second radio base station identified by the base station identification unit.

A fifteenth feature of the present invention relates to the fourteenth feature of the present invention, and is summarized as follows. The control device includes a storage unit (storage unit 2130) configured to store therein connection information in which terminal identification information for identifying a radio terminal connected to any of the plurality of radio base stations is associated with the radio base station to which the radio terminal is connected, the second radio signal includes terminal identification information for identifying the second radio terminal, and the base station identification unit identifies the second radio base station from among the plurality of radio base stations on the basis of the connection information stored in the storage unit and the terminal identification information included in the second radio signal.

A sixteenth feature of the present invention relates to the fifteenth feature of the present invention, and is summarized as follows. The interference information transmitter transmits the terminal identification information included in the second radio signal to the second radio base station in addition to the interference information, and the second radio base station includes: a terminal identification unit (terminal identification unit 2322) configured to identify the second radio terminal on the basis of the terminal identification information received from the control device, from among a plurality of radio terminals connected to the second radio base station; and a control information transmitter (transmitter 2312) configured to transmit the control information to the second radio terminal identified by the terminal identification unit.

A seventh feature of the present invention relates to the fourteenth feature of the present invention, and is summarized as follows. The control device includes a storage unit (storage unit 2130) configured to store therein channel information in which channel identification information for identifying a communication channel used in uplink communications by a radio terminal connected to any of the plurality of radio base stations is associated with the radio base station to which the radio terminal is connected, and the base station identification unit identifies the second radio base station from among the plurality of radio base stations on the basis of the channel information stored in the storage unit and the channel identification information for identifying the predetermined communication channel.

An eighteenth feature of the present invention relates to the seventeenth feature of the present invention, and is summarized as follows. The interference information transmitter transmits, to the second radio base station, the channel identification information for identifying the predetermined communication channel in addition to the interference information, the second radio base station includes: a terminal identification unit (terminal identification unit 2322) configured to identify the second radio terminal on the basis of the channel identification information received from the control device from among a plurality of radio terminals connected to the second radio base station; and a control information transmitter (transmitter 2312) configured to transmit the control information to the second radio terminal identified by the terminal identification unit.

A nineteenth feature of the present invention relates to the seventeenth feature of the present invention, and is summarized as follows. The second radio signal includes a signal sequence specific to the second radio base station, and the base station identification unit identifies the second radio base station from among the plurality of radio base stations on the basis of the signal sequence included in the second radio signal.

A twentieth feature of the present invention relates to the twelfth feature of the present invention, and is summarized as follows. The interference information is information indicating the arrival direction estimated by the first radio base station, or information for identifying a transmission antenna weight for directing the null point toward the first radio base station.

A $21^{st}$ feature of the present invention relates to the twelfth feature of the present invention, and is summarized as follows. The control information is information indicating the arrival direction estimated by the first radio base station, or information for identifying a transmission antenna weight for directing the null point toward the first radio base station.

A $22^{nd}$ feature of the present invention relates to the thirteenth feature of the present invention, and is summarized as follows. The control device is included in the first radio base station or is provided separately from the first radio base station and the second radio base station.

According to a $23^{rd}$ feature of the present invention, there is provided a radio base station (radio base station BS1 or BS1') comprising: a receiver configured to receive a first radio signal, for which a predetermined communication channel (channel A) is used, from a radio terminal (radio terminal UE1) having a plurality of transmission antennas; an interference information generation unit (interference information generation unit 2222) configured to generate interference information based on an arrival direction (direction D1) of the second radio signal to the radio base station if the receiver receives a second radio signal, for which the predetermined communication channel is used, from a radio terminal (radio terminal UE4) connected to a different radio base station (radio base station BS2); and an interference information transmitter (wired communication unit 2240) configured to transmit the interference information generated by the interference information generation unit to either the different radio base station or a control device (control device 2100A) configured to control the radio base station and the different radio base station.

According to a $24^{th}$ feature of the present invention, there is provided a radio base station (radio base station BS2) comprising: a receiver (receiver 2311) configured to receive a radio signal, for which a predetermined communication channel (channel A) is used, from a radio terminal (radio terminal UE4) having a plurality of transmission antennas (antennas 2401, 2402); an interference information acquisition unit (interference information acquisition unit 2321) configured to acquire interference information based on an arrival direction (direction D1) of the radio signal to a different radio base station (radio base station BS1) from either the different radio base station or a control device (control device 2100A) configured to control the radio base station and the different radio base station; and a control information transmitter (transmitter 2312) configured to transmit control information to the radio terminal on the basis of the interference information acquired by the interference information acquisition unit, the control information being for directing, toward the different radio base station, a null point of a directional beam formed by the plurality of transmission antennas.

According to a 25$^{th}$ feature of the present invention, there is provided a control device (control device 2100A) configured to control: a first radio base station (radio base station BS1 or BS1') configured to receive a first radio signal, for which a predetermined communication channel (channel A) is used, from a first radio terminal (radio terminal UE1) having a plurality of first transmission antennas; and a second radio base station (radio base station BS2) configured to receive a second radio signal, for which the predetermined communication channel is used, from a second radio terminal (radio terminal UE4) having a plurality of second transmission antennas (antennas 2401, 2402), the control device comprising: a base station identification unit (base station identification unit 2121) configured to identify the second radio base station on the basis of information on the second radio signal from a plurality of radio base stations including the second radio base station if the first radio base station receives the second radio signal from the second radio terminal; and an interference information transmitter (transmitter 2112) configured to transmit interference information to the second radio base station identified by the base station identification unit, the interference information being based on an arrival direction (direction D1) of the second radio signal to the first radio base station.

According to a 26$^{th}$ feature of the present invention, there is provided a radio communication method comprising the steps of: receiving by a first radio base station a first radio signal, for which a predetermined communication channel is used, from a first radio terminal having a plurality of first transmission antennas; receiving by a second radio base station a second radio signal, for which the predetermined communication channel is used, from a second radio terminal having a plurality of second transmission antennas; generating interference information based on an arrival direction of the second radio signal to the first radio base station if the first radio base station receives the second radio signal from the second radio terminal; transmitting by a control device the interference information generated by the first radio base station to the second radio base station, the control device being configured to control the first radio base station and the second radio base station; and transmitting, from the second radio base station to the second radio terminal, control information based on the received interference information upon receipt of the interference information, the control information being for directing, toward the first radio base station, a null pint of a directional beam formed by the plurality of second transmission antennas.

According to the present invention, it is possible to provide a radio communication system, a radio terminal, a control device and a radio communication method with which the communication quality can be improved sufficiently even in a case where a radio terminal receives an interference signal in downlink communications.

In addition, according to the present invention, it is possible to provide a radio communication system, a radio base station, a control device and a radio communication method with which the communication quality can be improved sufficiently even in a case where a radio base station receives an interference signal in uplink communications.

BRIEF DESCRIPTION OF THE DRAWINGS

FIG. 4 is a functional block diagram showing a configuration of a radio terminal according to the first embodiment of the present invention.

FIG. 5 is a functional block diagram showing a configuration of a radio base station (first radio base station) according to the first embodiment of the present invention.

DESCRIPTION OF EMBODIMENTS

Next, a description will be given of first to fourth embodiments of the present invention with reference to the drawings. In the description of the drawings in the following embodiments, same or similar reference signs denote same or similar portions.

[First Embodiment]

In the first embodiment, a description will be given of (1) Summary of Radio Communication System 1010A, (2) Detailed Configuration of Radio Communication System 1010A, (3) Transmission Directivity Control in Radio Base Station BS2, (4) Operation of Radio Communication System, and (5) Effects.

(1) Summary of Radio Communication System 1010A

A description will be given of a summary of a radio communication system 1010A in the order of (1.1) Schematic Configuration of Radio Communication System 1010A and (1.2) Schematic Operation of Radio Communication System 1010A.

(1.1) Schematic Configuration of Radio Communication System 10A

Figure 1:
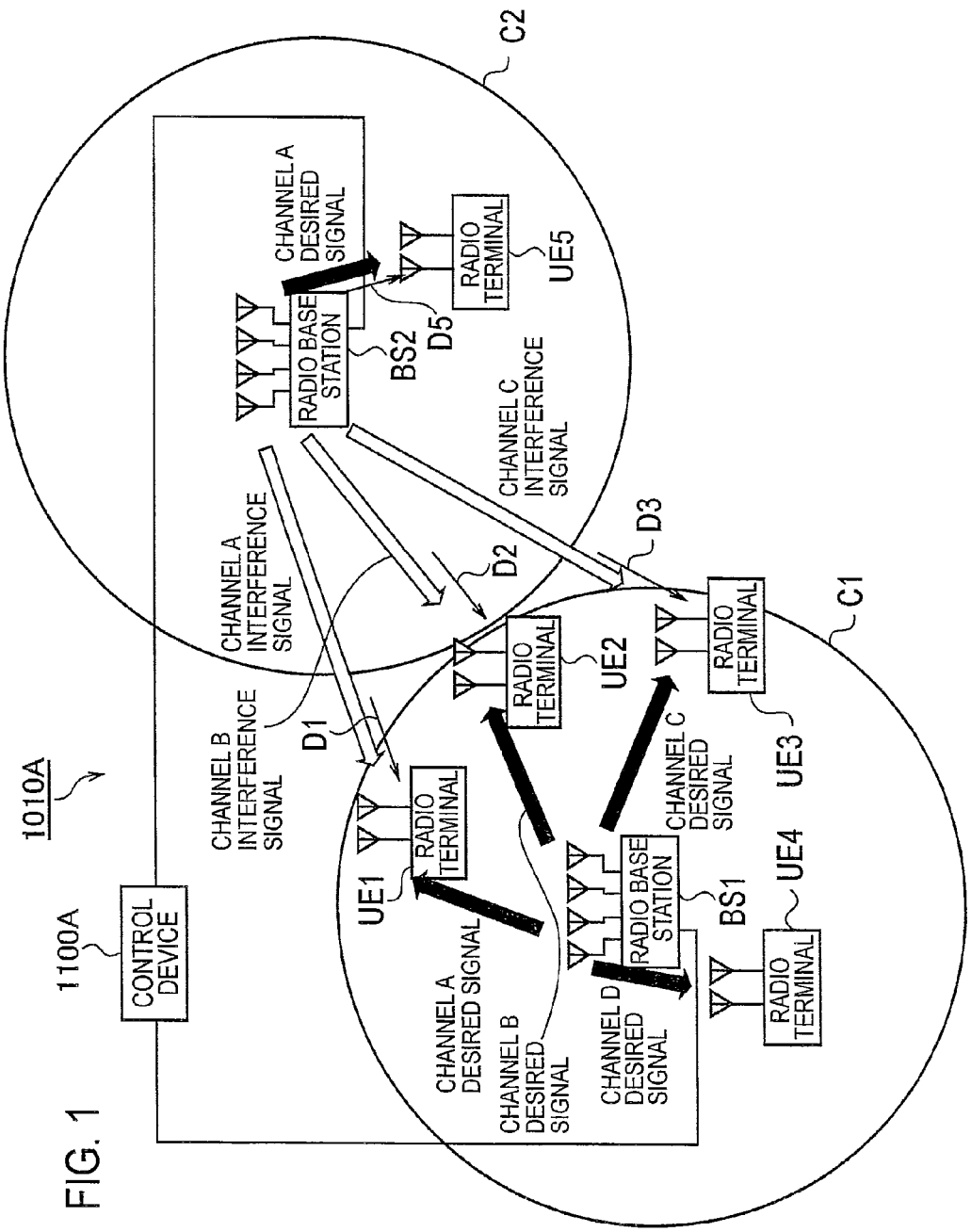
FIG. 1 is an overall configuration diagram of a radio communication system according to a first embodiment of the present invention.

FIG. 1 is an overall configuration diagram of the radio communication system 1010A according to the first embodiment.

As shown in FIG. 1, the radio communication system 1010A includes a radio terminal UE1, a radio terminal UE2, a radio terminal UE3, a radio terminal UE4, a radio terminal UE5, a radio base station BS1 (first radio base station), a radio base station BS2 (second radio base station) and a control device 1100A.

In FIG. 1, only the radio base station BS1 and the radio base station BS2 are illustrated for the convenience of description, but a different radio base station is provided adjacent to each of the radio base station BS1 and the radio base station BS2.

The radio communication system 1010A has a configuration based on the LTE (Long Term Evolution) standard, which is standardized in 3GPP (3rd Generation Partnership Project). In the first embodiment, downstream (hereinafter, "downlink") communications will be mainly described.

The radio base station BS1 is a connection destination of the radio terminals UE1 to UE4 located within a cell C1 and performs downlink communications with the radio terminals UE1 to UE4. The radio terminals UE1 to UE3 among the radio terminals UE1 to UE4 are located at an end portion of the cell C1.

The radio base station BS2 is a connection destination of the radio terminal UE5 located within a cell C2 adjacent to the cell C1 and performs downlink communications with the radio terminal UE5.

The control device 1100A is provided on a backbone network, which is a wired communication network. The control device 1100A is wire-connected to the radio base station BS1 and the radio base station BS2. The control device 1100A controls the radio base station BS1 and the radio base station BS2.

The radio communication system 1010A employs an orthogonal frequency division multiple access (OFDMA) scheme, which is one of multi-carrier communication schemes. In the OFDMA scheme, a communication channel called a subchannel is formed by use of multiple subcarriers (hereinafter, a "channel"), and then, a radio base station allocates the channel to a radio terminal. In addition, the radio communication system 1010A employs a frequency division duplex (FDD) scheme as a duplex system.

Figure 2:
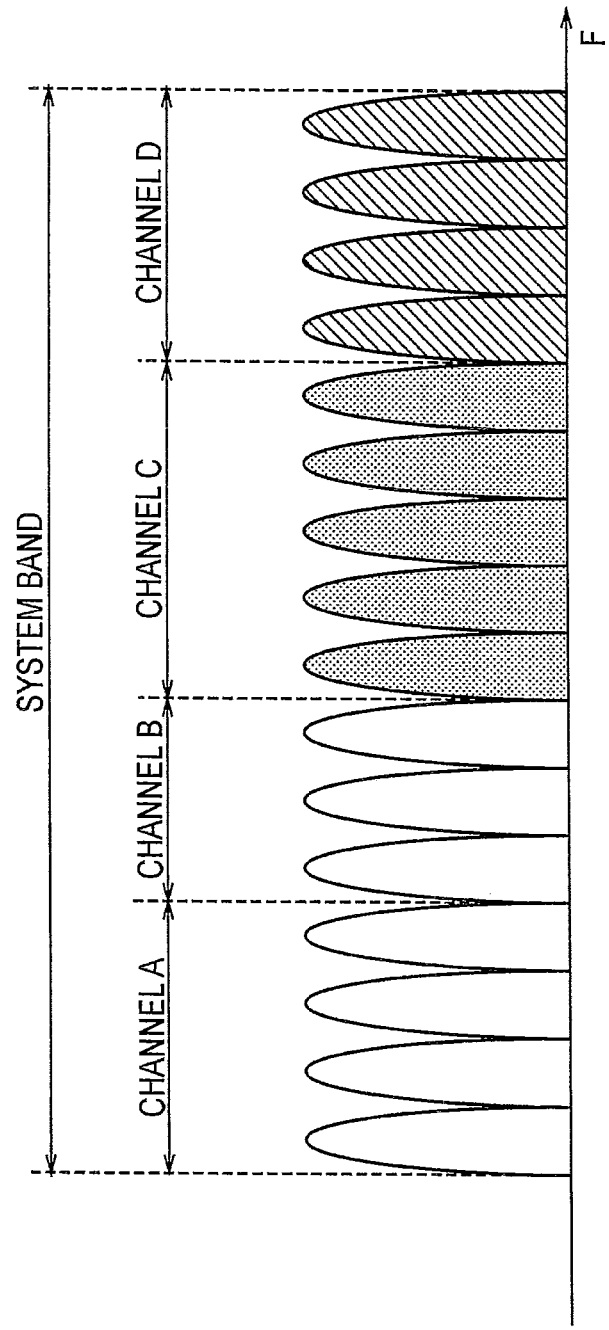
FIG. 2 is a diagram for describing channels used in the radio communication system according to the first embodiment of the present invention.

In the example shown in FIG. 1, the radio base station BS1 allocates channels A, B, C and D shown in FIG. 2 to the radio terminals UE1, UE2, UE3 and UE4, respectively. Hereinafter, a radio signal transmitted from the radio base station BS1 by use of these channels is termed as a first radio signal.

The radio base station BS2 allocates the channel A shown in FIG. 2 to the radio terminal UE5 and also allocates the channels B, C and D to not shown other radio terminals. Hereinafter, a radio signal transmitted from the radio base station BS2 by use of these channels is termed as a second radio signal.

The radio terminal UE1 receives a first radio signal for which the channel A is used from the radio base station BS1 as a desired signal and also receives a second radio signal for which the channel A is used from the radio base station BS2 as an interference signal. Here, the radio base station BS1 is the connection destination of the radio terminal UE1. The second radio signal for which the channel A is used travels from the radio base station BS2 in a direction D1 and arrives at the radio terminal UE1.

Note that, the radio terminal UE5 receives the second radio signal for which the channel A is used from the radio base station BS2 as a desired signal. The second radio signal for which the channel A is used travels from the radio base station BS2 in a direction D5 and arrives at the radio terminal UE1.

Likewise, the radio terminal UE2 receives a first radio signal for which the channel B is used from the radio base station BS1 as a desired signal and also receives a second radio signal for which the channel B is used from the radio base station BS2 as an interference signal. Here, the radio base station BS1 is the connection destination of the radio terminal UE2. The second radio signal for which the channel B is used travels from the radio base station BS2 in a direction D2 and arrives at the radio terminal UE2.

The radio terminal UE3 receives a first radio signal for which the channel B is used from the radio base station BS1 as a desired signal and also receives a second radio signal for which the channel B is used from the radio base station BS2 as an interference signal. Here, the radio base station BS1 is the connection destination of the radio terminal UE3. The second radio signal for which the channel C is used to a direction D3 from the radio base station BS2 and arrives at the radio terminal UE3.

The radio base station BS1 and the radio base station BS2 perform downlink communications based on the aforementioned closed loop MIMO.

To put it more specifically, the radio base station BS1 transmits the first radio signals to the radio terminals UE1 to UE4 via multiple antennas (first transmission antennas) provided to the radio base station BS1. The radio terminals UE1 to UE4 respectively receive the first radio signals via multiple antennas (reception antennas) provided to each of the radio terminals UE1 to UE4.

The radio base station BS2 transmits the second radio signal to the radio terminal UE5 via multiple antennas (second transmission antennas) provided to the radio base station BS2. The radio terminal UE5 receives the second radio signal via multiple antennas (reception antennas) provided to the radio terminal UE5.

In the first embodiment, a description will be given of MIMO in which four transmission antennas and two reception antennas are provided (so called 4×2 MIMO) in downlink communications.

Each of the radio terminals UE1 to UE4 analyzes the first radio signal received from the radio base station BS1 and periodically sends the radio base station BS1 feedback information for adaptively controlling multiple-antenna transmission in the radio base station BS1. The radio terminal UE5 analyzes the second radio signal received from the radio base station BS2 and periodically sends the radio base station BS2 feedback information for adaptively controlling multiple-antenna transmission in the radio base station BS2.

In the LTE standard, the feedback information includes an "RI (Rank Indicator)," a "PMI (Precoding Matrix Indicator)," and a "CQI" (Channel Quality Indicator). The RI is information for controlling the number of streams, which are signal sequences (termed as "layers" in the LTE standard). The PMI is information for controlling a transmission antenna weight (termed as a "precoding matrix" in the LTE standard). The CQI is information for controlling a transmission power and a modulation scheme. In addition, the RI, PMI and CQI are also used in resource scheduling in the radio base station BS1 and the radio base station BS2.

Each of the radio terminals UE1 to UE4 determines the number of layers and then transmits the RI corresponding to the determined number of layers to the radio base station BS1 as the feedback information. Each of the radio terminals UE1 to UE4 calculates a precoding matrix with which the reception quality (such as an SNR) becomes the largest, in accordance with the number of layers, and then transmits the PMI in accordance with the calculation result to the radio base station BS1 as the feedback information. In addition, each of the radio terminals UE1 to UE4 finds a CQI corresponding to the reception quality and then transmits the CQI to the radio base station BS1 as the feedback information. The radio base station BS1 controls the number of layers, the precoding matrix, the transmission power and the modulation scheme or the like in accordance with the feedback information.

Likewise, the radio terminal UE5 analyzes the radio signal received from the radio base station BS2 and periodically sends the radio base station BS2 feedback information (RI, PMI, CQI) for adaptively controlling multiple-antenna transmission in the radio base station BS2.

(1.2) Schematic Operation of Radio Communication System 10A

Figure 3:
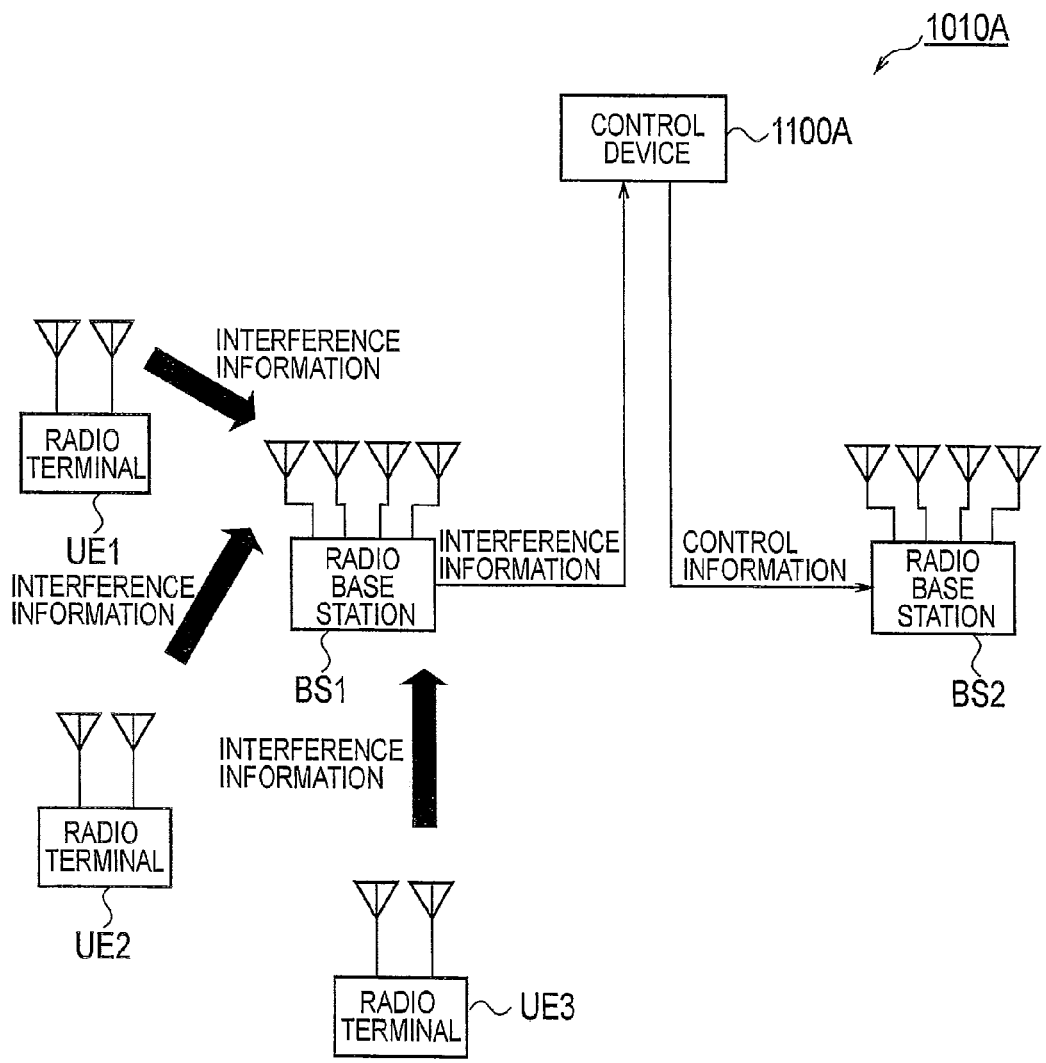
FIG. 3 is a diagram for describing a schematic operation of the radio communication system according to the first embodiment of the present invention.

Next, a description will be given of a schematic operation of the radio communication system 1010A with reference to FIG. 3.

Upon receipt of the second radio signal from the radio base station BS2 as an interference signal, the radio terminal UE1 estimates an arrival direction D1 of the second radio signal to the radio terminal UE1 and then transmits interference information based on the arrival direction D1 to the radio base station BS1.

In addition, upon receipt of the second radio signal from the radio base station BS2 as an interference signal, the radio terminal UE2 estimates an arrival direction D2 of the second radio signal to the radio terminal UE2 and then transmits interference information based on the arrival direction D2 to the radio base station BS1.

Upon receipt of the second radio signal from the radio base station BS2 as an interference signal, the radio terminal UE3 estimates an arrival direction D3 of the second radio signal to the radio terminal UE3 and then transmits interference information based on the arrival direction D3 to the radio base station BS1.

Each of the radio terminals UE1 to UE3 transmits the interference information with the aforementioned feedback information to the radio base station BS1, for example.

The radio base station BS1 relays the interference information received from each of the radio terminals UE1 to UE3 to the control device 1100A. The control device 1100A transmits control information for each of the directions (arrival directions D1 to D3) of the radio terminals UE1 to UE3 to the radio base station BS2 on the basis of the received interference information. Specifically, the control information is for directing a null point (dead spot) of a directional beam, which are formed by the multiple transmission antennas provided to the radio base station BS2, to face in the arrival direction.

The communication form in which MIMO communications are performed while the directional beam are formed is generally termed as "beam forming MIMO."

The radio base station BS2 transmits the second radio signal while directing the null point to each of the directions D1 to D3 of the radio terminals UE1 to UE3 and also directing the directional beam to the direction D5 of the radio terminal UE5 on the basis of the control information received from the control device 1100A and the feedback information fed back from the radio terminal UE5.

Note that, the interference information is information indicating a coefficient or angle indicating the arrival direction of the interference signal, for example. An existing arrival direction estimation technique can be used in the estimation of the arrival direction. The estimation of the arrival direction, however, needs to acquire an absolute direction rather than estimation of a relative direction, which changes in accordance with the state of the radio terminal. In a case where an arrival direction estimation technique for acquiring the relative direction is used, the absolute direction can be obtained by use the arrival direction estimation technique with a GPS or a directional sensor provided to the radio terminal.

For the purpose of reducing the information amount of interference information, the information indicating the coefficient or angle indicating the arrival direction may be converted into a PMI and then, the PMI may be used as the interference information. In this case, the radio terminal UE1 transmits the PMI corresponding to the precoding matrix for directing the null point to the direction D1 of the radio terminal UE1 to the radio base station BS1 as the interference information.

Likewise, the radio terminal UE2 sends the radio base station BS1 as the interference information the PMI corresponding to the precoding matrix for directing the null point to the direction D2 of the radio terminal UE2. The radio terminal UE3 sends the radio base station BS1 as the interference information the PMI corresponding to the precoding matrix for directing the null point to the direction D3 of the radio terminal UE3.

In a case where the information indicating the coefficient or angle indicating the arrival direction is used as the interference information, the coefficient or angle indicating the arrival direction may be used as the control information without any change, or the information may be converted into a PMI and then used as the control information. In a case where a PMI is used as the interference information, the PMI can be used as the control information without any change.

The use of a PMI as the interference information and the control information allows a reduction in the information amount of the interference information and the control information, thereby, making it possible to facilitate implementation in the radio communication system 1010A.

(2) Detailed Configuration of Radio Communication System 1010A

Next, a description will be given of a detailed configuration of the radio communication system 1010A in the order of (2.1) Configuration of Radio Terminal UE1, (2.2) Configuration of Radio Base Station BS1, (2.3) Configuration of Control device Control device 1100A and (2.4) Configuration of Radio Base Station BS2. Note that, a description will be mainly given of the configurations related to the present invention below.

(2.1) Configuration of Radio Terminal UE1

FIG. 4 is a functional block diagram showing a configuration of the radio terminal UE1. The other radio terminals (radio terminals UE2 to UE5) are configured in the same manner as the radio terminal UE1. Accordingly, the radio terminal UE1 will be described herein as the representative of the radio terminals.

As shown in FIG. 4, the radio terminal UE1 includes antennas 1201 and 1202, a radio communication unit 1210, a controller 1220 and a storage unit 1230.

The radio communication unit 210 has a receiver 1211 configured to receive a radio signal via the antennas 1201 and 1202, and a transmitter 1212 configured to transmit a radio signal via the antennas 1201 and 1202. The receiver 1211 performs channel estimation on the basis of a pilot signal which is a known signal included in the first radio signal received from the radio base station BS1. The receiver 1211 then generates the feedback information by use of the result of channel estimation. The transmitter 1212 transmits the generated feedback information to the radio base station BS1.

The controller 1220 is configured of a CPU, for example, and configured to control various functions included in the radio terminal UE1. The storage unit 1230 is configured of a memory, for example, and configured to store various types of information used in control or the like in the radio terminal UE1.

The controller 1220 has an arrival direction estimation unit 1221 and an interference information generation unit 1222.

The arrival direction estimation unit 1221 is configured to estimate the arrival direction D1 of the second radio signal to the radio terminal UE1 when the receiver 1211 receives the second radio signal (interference signal) from the radio base station BS2.

The interference information generation unit 1222 is configured to generate interference information based on the arrival direction D1 estimated by the arrival direction estimation unit 1221. In a case where a PMI is used as the interference information as described above, the storage unit 1230 previously holds therein an association between the arrival direction D1 and the PMI, and the interference information generation unit 1222 generates (acquires) the PMI from the association. Then, the transmitter 212 transmits the interference information to the radio base station BS1.

(2.2) Configuration of Radio Base Station BS1

FIG. 5 is a functional block diagram showing a configuration of the radio base station BS1.

As shown in FIG. 5, the radio base station BS1 includes antennas 1301 to 1304, a radio communication unit 1310, a controller 1320 and a storage unit 1330 and a wired communication unit 1340.

The radio communication unit 1310 has a receiver 1311 configured to receive radio signals from the radio terminals UE1 to UE4 via the antennas 1301 to 1304, and a transmitter 1312 configured to transmit radio signals to the radio terminals UE1 to UE4 via the antennas 1301 to 1304. The receiver 1311 acquires the feedback information included in the received radio signals. In addition, the receiver 1311 acquires the interference information included in the received radio signals.

The transmitter 1312 controls multiple-antenna transmission on the basis of the feedback information. To be more specific, the transmitter 1312 distributes the transmission signal into multiple layers in accordance with the RI, then weights the transmission signals of the respective layers in accordance with the PMI (hereinafter, "precoding") and then performs adaptive modulation and transmission power control for the transmission signals in accordance with the CQI after the precoding.

The controller 1320 is configured of a CPU, for example, and configured to control various functions included in the radio base station BS1. The storage unit 1330 is configured of a memory, for example, and configured to store various types of information used in control or the like in the radio base station BS1. The wired communication unit 1340 is connected to the control device 1100A via a wired communication network. The wired communication unit 1340 transmits the interference information to the control device 1100A.

(2.3) Configuration of Control device 1100A

Figure 6:
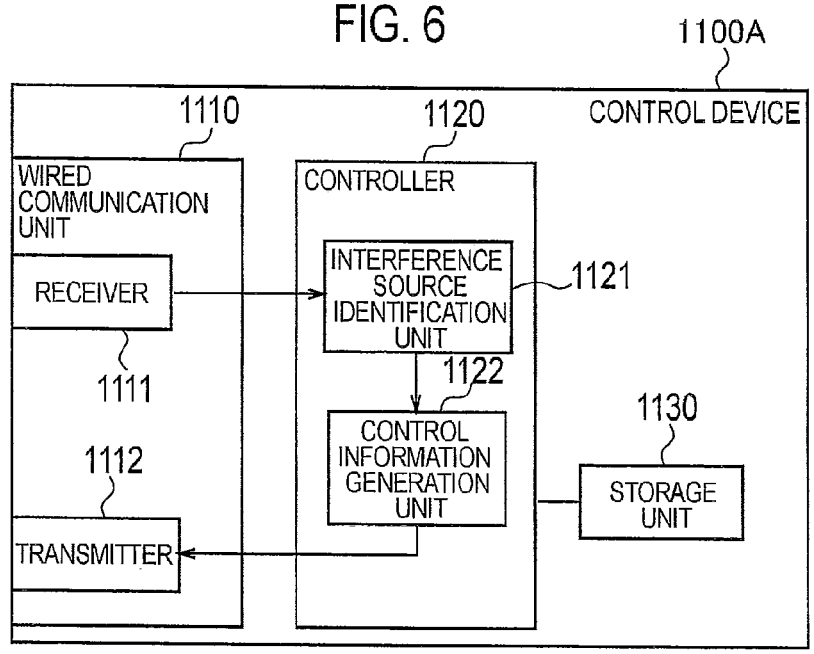
FIG. 6 is a functional block diagram showing a configuration of a control device according to the first embodiment of the present invention.

FIG. 6 is a functional block diagram showing a configuration of the control device 1100A.

As shown in FIG. 6, the control device 1100A includes a wired communication unit 1110, a controller 1120 and a storage unit 1130.

The wired communication unit 1110 is connected to the radio base station BS1 and the radio base station BS2 via a wired communication network.

The wired communication unit 1110 has a receiver 1111 configured to receive a signal and a transmitter 1112 configured to transmit a signal. The receiver 1111 receives the interference information from the radio base station BS1.

The controller 1120 is configured of a CPU, for example, and configured to control various functions included in the control device 1100A. The storage unit 1130 is configured of a memory, for example, and configured to store various types of information used in control or the like in the control device 1100A.

The controller 1120 has an interference source identification unit 1121 and a control information generation unit 1122. The interference source identification unit 1121 is configured to identify an interference source radio base station from among multiple radio base stations. The method of identifying the interference source will be described later. The control information generation unit 1122 is configured to generate the control information on the basis of the interference information received by the receiver 1111. The transmitter 1112 transmits the control information to the radio base station BS2.

(2.4) Configuration of Radio Base Station BS2

Figure 7:
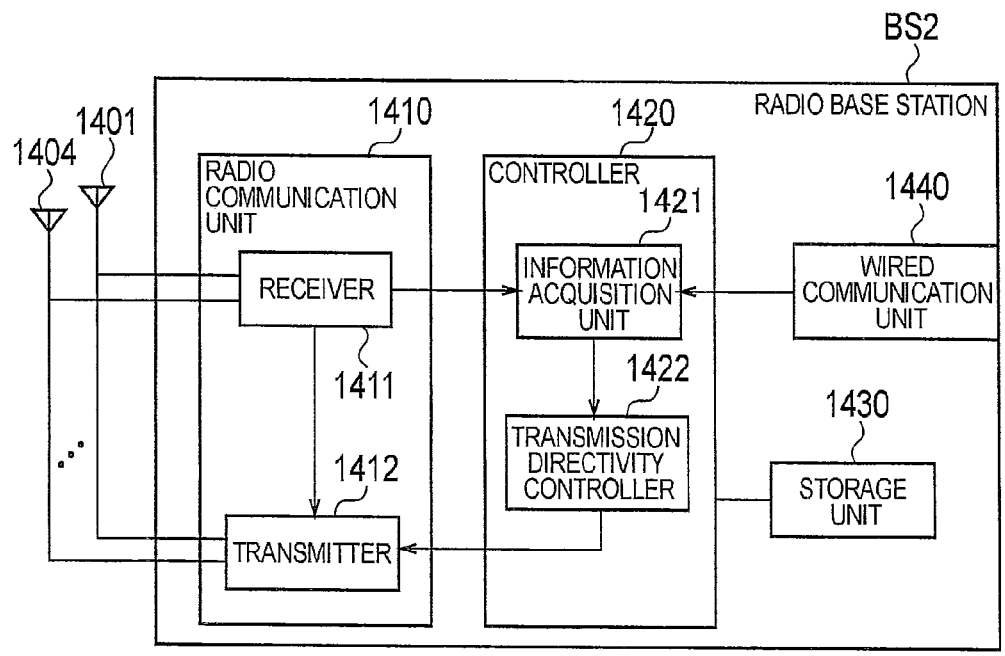
FIG. 7 is a functional block diagram showing a configuration of a radio base station (second radio base station) according to the first embodiment of the present invention.

FIG. 7 is a functional block diagram showing a configuration of the radio base station BS2.

As shown in FIG. 7, the radio base station BS2 includes antennas 1401 to 1404, a radio communication unit 1410, a controller 1420 and a storage unit 1430 and a wired communication unit 1440.

The radio communication unit 1410 has a receiver 1411 configured to receive radio signals from the radio terminal UE5 via the antennas 1401 to 1404, and a transmitter 1412 configured to transmit radio signals to the radio terminal UE5 via the antennas 1401 to 1404.

The receiver 1411 acquires the feedback information included in the radio signal received from the radio terminal UE5. The transmitter 1412 controls multiple-antenna transmission on the basis of the feedback information. To put it more specifically, the transmitter 1412 distributes the transmission signal into multiple layers in accordance with the RI, then performs precoding on the transmission signals of the respective layers in accordance with the PMI and then performs adaptive modulation and transmission power control for the transmission signals in accordance with the CQI after the precoding.

The controller 1420 is configured of a CPU, for example, and configured to control various functions included in the radio base station BS2. The storage unit 1430 is configured of a memory, for example, and configured to store various types of information used in control or the like in the radio base station BS2. The wired communication unit 1440 is connected to the control device 1100A via a wired communication network. The wired communication unit 1440 receives the control information from the control device 1100A.

The controller 1420 has an information acquisition unit 1421 and a transmission directivity controller 1422. The information acquisition unit 1421 forms an acquisition unit configured to acquire the control information for directing the null point toward the radio terminals UE1 to UE3 receiving the second radio signals as the interference signals during communications with the different radio base station (radio base station BS1).

The transmission directivity controller 1422 forms a controller configured to control a directional beam formed by the antennas 1401 to 1404 on the basis of the feedback information fed back from the radio terminal UE5. To put it more specifically, the precoding using the precoding matrix corresponding to the PMI fed back from the radio terminal UE5 makes it possible to direct the directional beam formed by the antennas 1401 to 1404 to the radio terminal UE5. Furthermore, the transmission directivity controller 1422 directs the directional beam to the direction D5 of the radio terminal UE5 while directing the null point to each of the directions D1 to D3 of the radio terminals UE1 to UE3 on the basis of the feedback information and the control information acquired by the information acquisition unit 1421.

(3) Transmission Directivity Control in Radio Base Station BS2

Figure 8:
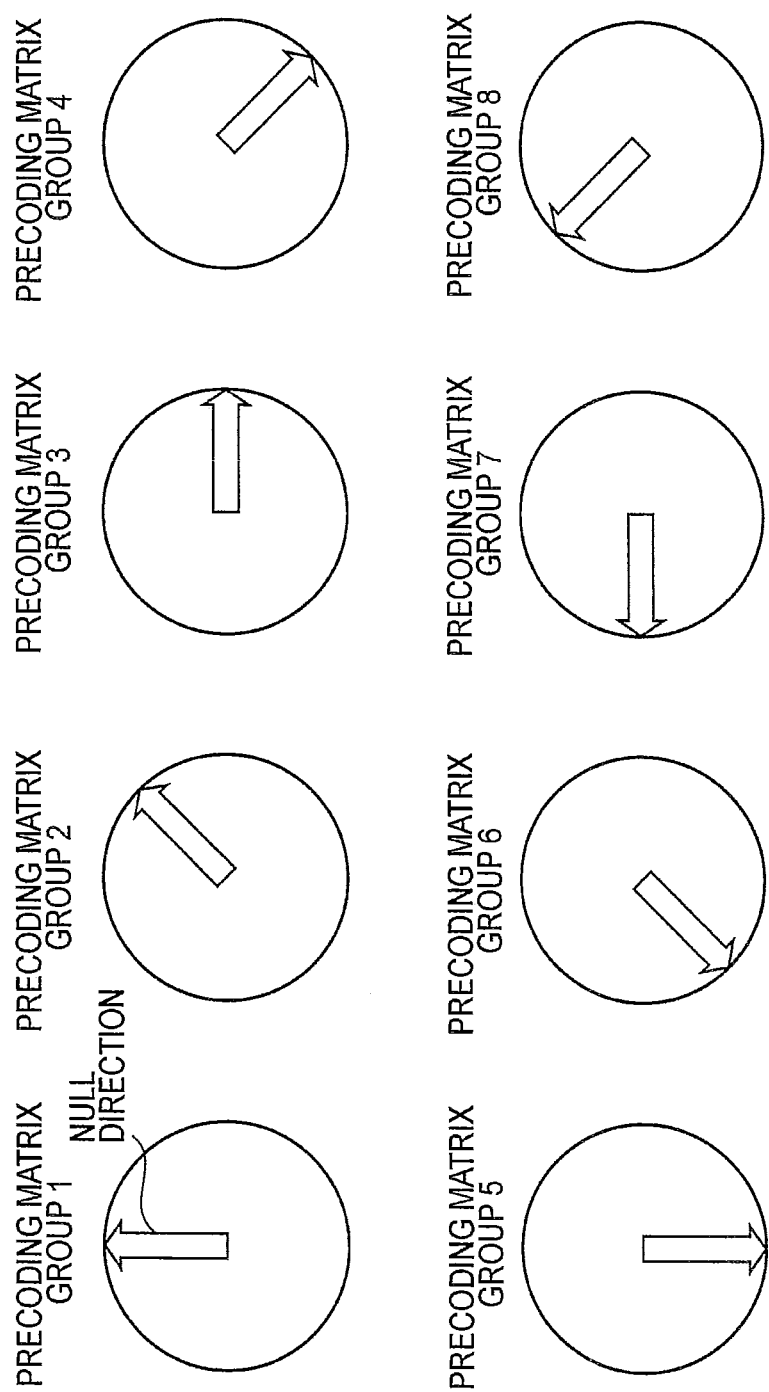
FIG. 8 is a diagram for describing details of transmission directivity control performed in the first embodiment of the present invention.

Next, the transmission directivity control performed by the transmission directivity controller 1422 will be described in detail with reference to FIG. 8 and FIG. 9. Here, a description will be given with an example of a case where the null point is directed to the direction (direction D1) of the radio terminal UE1.

The transmission directivity controller 1422 is configured to select a precoding matrix group for directing the null point to the direction (D1 direction) of the radio terminal UE1. As shown in FIG. 8, precoding matrix groups are groups each formed of multiple precoding matrices each having a null point in the same direction. The precoding matrix groups are previously stored in the storage unit 1430. The example shown in FIG. 8 illustrates precoding matrix groups 1 to 8 having the null points in different directions, respectively.

Figure 9:
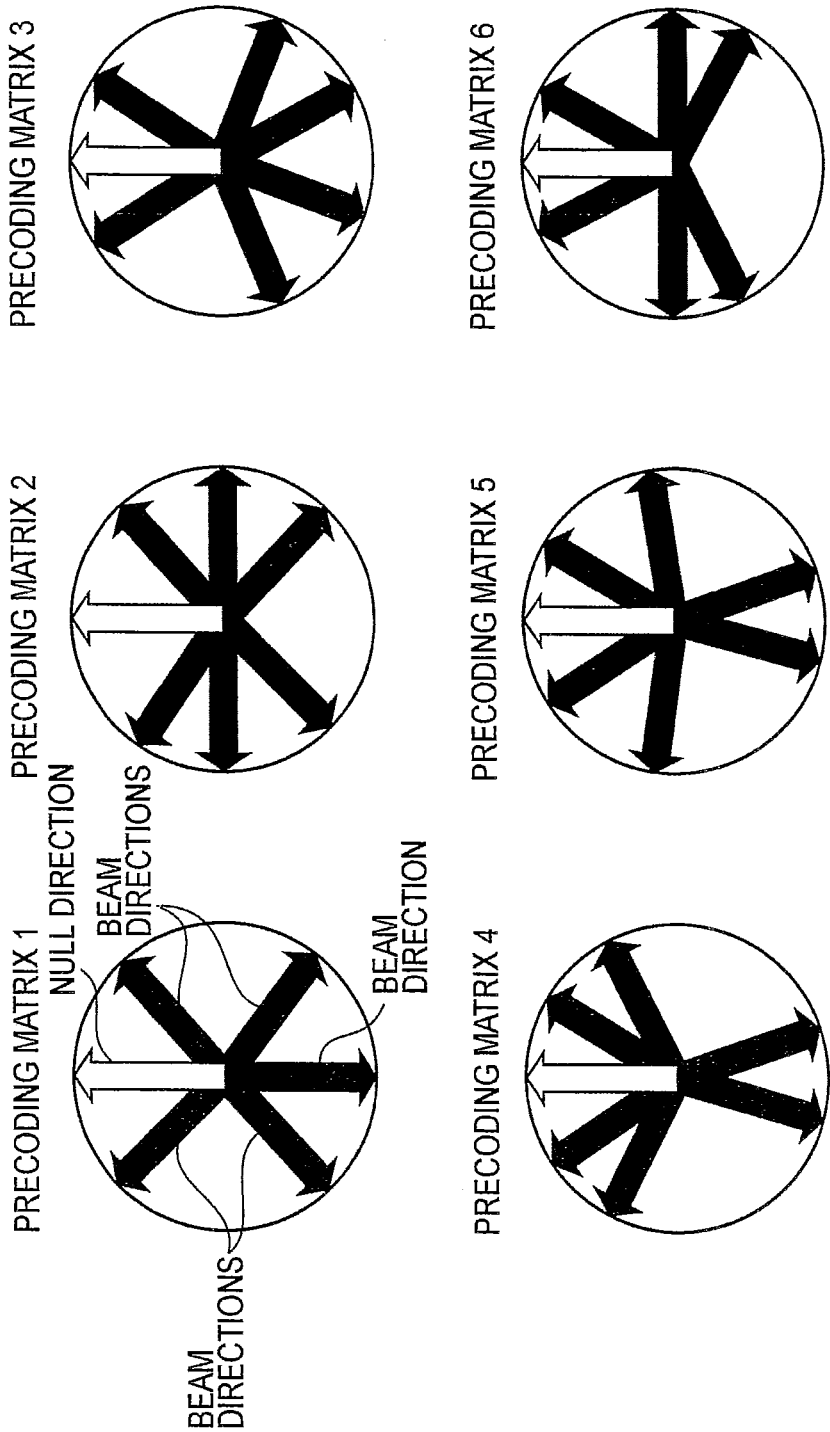
FIG. 9 is another diagram for describing the details of transmission directivity control performed in the first embodiment of the present invention.

As shown in FIG. 9, each of the precoding matrix groups has multiple precoding matrices each having directional beams in different directions. In the example shown in FIG. 9, each of the precoding matrices 1 to 6 included in the precoding matrix group 1 has a directional beam in six directions. The patterns of the directional beams of the precoding matrices 1 to 6 are different from each other.

The transmission directivity controller 1422 selects on the basis of the feedback information fed back from the radio terminal UE5 (PMI, to be more specific), a precoding matrix having a directional beam in the direction D5 of the radio terminal UE5 in the precoding matrix group having the null point in the direction D1 of the radio terminal UE1. The selected precoding matrix is applied to the precoding in the transmitter 412.

(4) Operation of Radio Communication System

Figure 10:
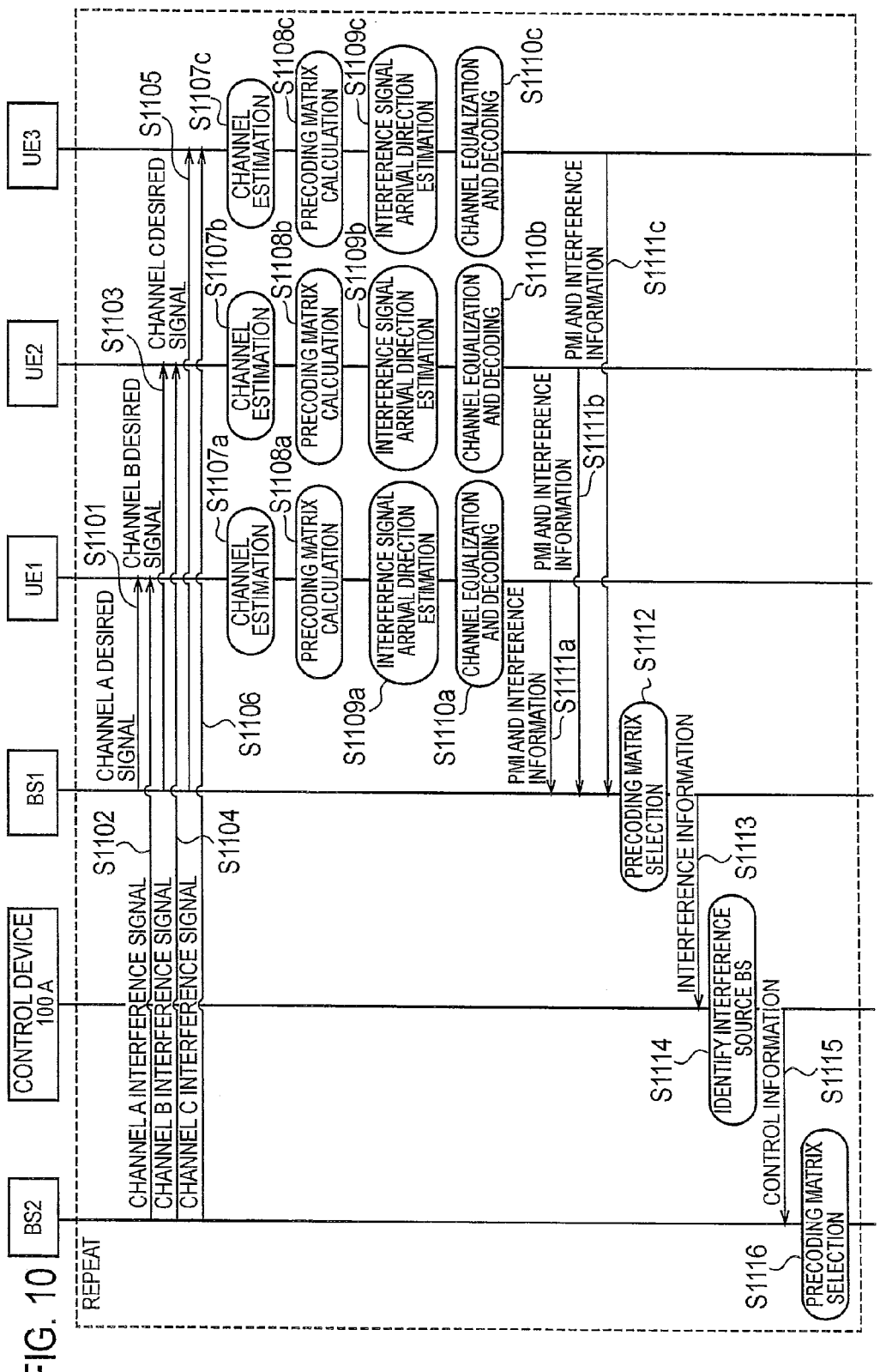
FIG. 10 is an operation sequence diagram showing an operation of the radio communication system according to the first embodiment of the present invention.

FIG. 10 is an operation sequence diagram showing an operation of the radio communication system 1010A. In FIG. 10, a description is given with illustration of only a PMI from the feedback information (RI, PMI, CQI) in accordance with the LTE standard. Note that, the operation sequence shown in FIG. 10 is repeatedly performed at predetermined time intervals (e.g., communication frame units).

In steps S1101, S1103 and S1105, the transmitter 1312 of the radio base station BS1 transmits the first signals for which the channels A, B and C are used to the radio terminals UE1 to UE3, respectively.

In steps S1102, S1104 and S1106, the transmitter 1412 of the radio base station BS2 transmits the second signals for which the channels A, B and C are used to the radio terminals UE5, UE6 (not shown), and UE7 (not shown), respectively. At this time, the radio terminals UE1, UE2 and UE3 located at a cell fringe of the radio base station BS1 receive as the desired signals the first radio signals transmitted from the radio base station BS1 and also receive as the interference signals the second radio signals transmitted from the radio base station BS2.

In steps S1107a, S1107b and S1107c, the receivers 1211 of the respective radio terminals UE1, UE2 and UE3 perform channel estimation for executing channel response of the radio propagation channels, on the basis of the pilot signals included in the first radio signals received from the radio base station BS1. The receivers 1211 of the respective radio terminals UE1, UE2 and UE3 acquire base station identification information for identifying the radio base station BS2, on the basis of the pilot signals included in the second radio signals received from the radio base station BS2 or the cell ID included in the second radio signals.

In steps S1108a, S1108b and S1108c, the receivers 1211 of the respective radio terminals UE1, UE2 and UE3 calculate on the basis of the estimated channel response the precoding matrices and then acquire PMIs corresponding to the calculated precoding matrices, respectively.

In step S1109a, the arrival direction estimation unit 1221 of the radio terminal UE1 estimates the arrival direction D1 of the second radio signal to the radio terminal UE1. The interference information generation unit 1222 of the radio terminal UE1 generates interference information on the basis of the arrival direction D1.

In step S1109b, the arrival direction estimation unit 1221 of the radio terminal UE2 estimates the arrival direction D2 of the second radio signal to the radio terminal UE2. The interference information generation unit 1222 of the radio terminal UE2 generates interference information on the basis of the arrival direction D2.

In step S1109c, the arrival direction estimation unit 1221 of the radio terminal UE3 estimates the arrival direction D3 of the second radio signal to the radio terminal UE3. The interference information generation unit 1222 of the radio terminal UE3 generates interference information on the basis of the arrival direction D3.

In steps S1110a, S1110b and S1110c, the receivers 1211 of the respective radio terminals UE1, UE2 and UE3 equalize the reception signals (channel equalization) on the basis of the estimated channel response and then decode the equalized reception signals. The decoded reception signals are inputted to the controllers 1220 of the radio terminals UE1, UE2 and UE3, respectively.

In steps S1111a, S1111b and S1111c, the transmitters 1212 of the respective radio terminals UE1, UE2 and UE3 transmit the interference information, the PMIs and the radio base station identification information to the radio base station BS1. The receiver 1311 of the radio base station BS1 receives the interference information, the PMIs and the radio base station identification information.

In step S1112, the transmitter 1312 of the radio base station BS1 selects a precoding matrix corresponding to the PMI received from the radio terminal UE1. When transmitting the first radio signal for which the channel A is used to the radio terminal UE1, next time, the transmitter 1312 performs precoding using the precoding matrix corresponding to the PMI received from the radio terminal UE1.

Likewise, when transmitting the first radio signal for which the channel B is used to the radio terminal UE2, next time, the transmitter 1312 of the radio base station BS1 performs precoding using the precoding matrix corresponding to the PMI received from the radio terminal UE2. When transmitting the first radio signal for which the channel C is used to the radio terminal UE3, next time, the transmitter 1312 performs precoding using the precoding matrix corresponding to the PMI received from the radio terminal UE3.

In step S1113, the wired communication unit 1340 of the radio base station BS1 transmits the interference information and the base station identification information received from each of the radio terminals UE1, UE2 and UE3 to the control device 1100A. The receiver 1111 of the control device 1100A receives the interference information and the base station identification information.

In step S1114, the interference source identification unit 1121 of the control device 1100A identifies the radio base station BS2 as the interference source from among multiple radio base stations on the basis of the base station identification information received by the receiver 1111. The control information generation unit 1122 of the control device 1100A generates on the basis of the interference information received by the receiver 1111 the control information addressed to the radio base station BS2 identified by the interference source identification unit 1121. To be more specific, the control information generation unit 1122 generates the control information corresponding to the channel A (radio terminal UE1), the control information corresponding to the channel B (radio terminal UE2) and the control information corresponding to the channel C (radio terminal UE3).

In step S1113, the transmitter 1112 of the control device 1100A transmits the control information generated by the control information generation unit 1122 to the radio base station BS2. The wired communication unit 1440 of the radio base station BS2 receives the control information.

Meanwhile, the receiver 1411 of the radio base station BS2 receives the PMIs as the feedback information from the radio terminal UE5, the radio terminal UE6 (not shown) and the radio terminal UE7 (not shown), which are connected to the radio base station BS2. The information acquisition unit 1421 of the radio base station BS2 acquires the control information from the wired communication unit 1440 and acquires the PMIs from the receiver 1411.

In step S1116, when the transmitter 1412 transmits the second radio signal for which the channel A is used, the transmission directivity controller 1422 controls the transmitter 1412 in such a way that the directional beam are directed to the direction D5 of the radio terminal UE5 while the null point is directed to the direction D1 of the radio terminal UE1. To be more specific, the transmission directivity controller 1422 selects a precoding matrix for directing the directional beam to the direction D5 of the radio terminal UE5 in the precoding matrix group for directing the null point to the direction D1 of the radio terminal UE1.

Likewise, when the transmitter 1412 transmits the second radio signal for which the channel B is used, the transmission directivity controller 1422 controls the transmitter 1412 in such a way that the directional beam are directed to the radio terminal UE6 (not shown) while the null point is directed to the radio terminal UE2 (direction D2).

In addition, when the transmitter 1412 transmits the second radio signal for which the channel C is used, the transmission directivity controller 1422 controls the transmitter 1412 in such a way that the directional beam are directed to the radio terminal UE7 (not shown) while the null point is directed to the radio terminal UE3 (direction D3).

(5) Effects

With the radio communication system 1010A according to the first embodiment, in a case where the radio terminals UE1 to UE3 receive the second radio signals from the radio base station BS2 as the interference signals, the null points in the radio base station BS2 are directed to the directions D1 to D3 of the radio terminals UE1 to UE3, respectively. Thus, the radio terminal UE1 can avoid receiving the second radio signal (interference signal), and the communication quality in the radio terminal UE1 can be improved sufficiently. Accordingly, the prevention of occurrence of the interference signals in the source makes it possible to provide high-speed downlink communications to each of the radio terminals while increasing the cell throughput.

In the first embodiment, the transmission directivity controller 1422 of the radio base station BS2 transmits the second radio signal while directing the null points to the directions D1 to D3 of the radio terminals UE1 to UE3 and also directing the directional beam to the direction D5 of the radio terminal UE5 on the basis of the control information received from the control device 1100A and the feedback information fed back from the radio terminal UE5. Accordingly, the communication quality in the radio terminal UE1 is improved sufficiently while the communication quality in the radio terminal UE5 can be kept in a good condition.

In the first embodiment, the interference source identification unit 1121 of the control device 1100A identifies the radio base station BS2 from among multiple radio base stations on the basis of the base station identification information and then transmits the control information to the identified radio base station BS2. Thus, even if there are multiple radio base stations that are candidates for the interference source, the interference source can be identified easily, and the control information can be transmitted to the appropriate radio base station.

[Modification Example 1 of First Embodiment]

In the aforementioned first embodiment, the interference source identification unit 1121 of the control device 1100A identifies the radio base station BS2 of the interference source from among multiple radio base stations on the basis of the radio base station identification information, but it is also possible to identify the interference source by use of the following method.

In this modification example, the storage unit 1130 of the control device 1100A previously holds therein correspondence information associating interference information with each of the radio base stations. The interference source identification unit 1121 of the control device 1100A identifies the radio base station BS2 of the interference source from among multiple radio base stations on the basis of the interference information received by the receiver 1111 and the correspondence information held in the storage unit 1130.

According to the aforementioned method, the base station identification information does not have to be transmitted and received. Thus, the amount of information to be transmitted and received can be reduced as compared with the first embodiment.

[Modification Example 2 of First Embodiment]

In the aforementioned first embodiment, the information indicating the coefficient or angle indicating the arrival direction, or the PMI is used as the interference information and the control information.

However, location information indicating the location of each of the radio terminals UE1, UE2 and UE3 may be used as the interference information and the control information. In this case, an existing location detection technique such as location detection using a GPS can be used. In a case where the location information is used as the interference information and the control information, the transmission directivity controller 422 of the radio base station BS2 may identify the respective directions of the radio terminals UE1, UE2 and UE3 from the respective locations of the radio terminals UE1, UE2 and UE3.

[Modification Example 3 of First Embodiment]

In the aforementioned first embodiment, the information acquisition unit 1421 of the radio base station BS2 acquires the information indicating the coefficient or angle indicating the arrival direction, or the PMI as the control information, but it is also possible to acquire the control information by use of another method.

To be more specific, when the radio base station BS2 receives the uplink radio signals from the radio terminals UE1, UE2 and UE3, the information acquisition unit 1421 may estimate the arrival directions of the uplink radio signals and then acquire the information indicating the estimated arrival directions as the control information. In this case, the transmission directivity controller 1422 of the radio base station BS2 can identify the respective directions of the radio terminals UE1, UE2 and UE3 from the arrival directions of the uplink radio signals.

[Second Embodiment]

In the aforementioned first embodiment, the control device 1100A is provided separately from the radio base station BS1 and the radio base station BS2. In a second embodiment, a description is given of a case where the control device 1100A is included in the radio base station BS1.

Note that, a description is given of (1) Configuration of Radio Communication System 1010B, (2) Operation of Radio Communication System 1010B and (3) Effects in the second embodiment.

(1) Configuration of Radio Communication System 1010B

Figure 11:
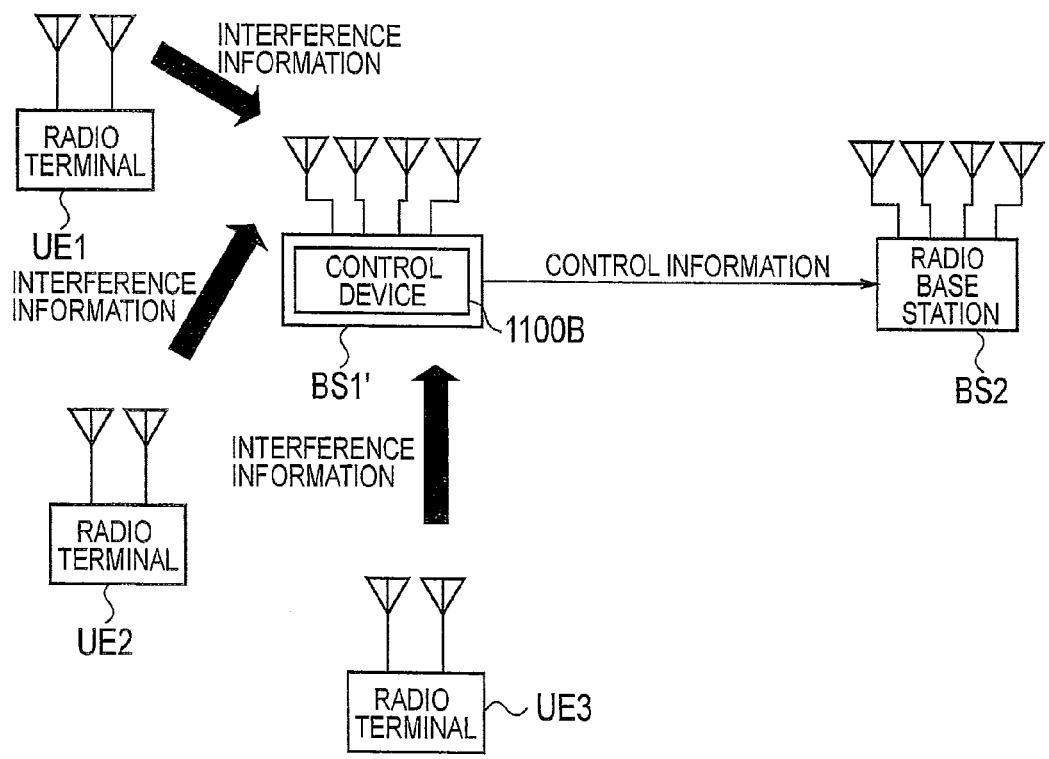
FIG. 11 is an overall configuration diagram of a radio communication system according to a second embodiment of the present invention.

FIG. 11 is an overall configuration diagram of the radio communication system 1010B according to the second embodiment.

Figure 12:
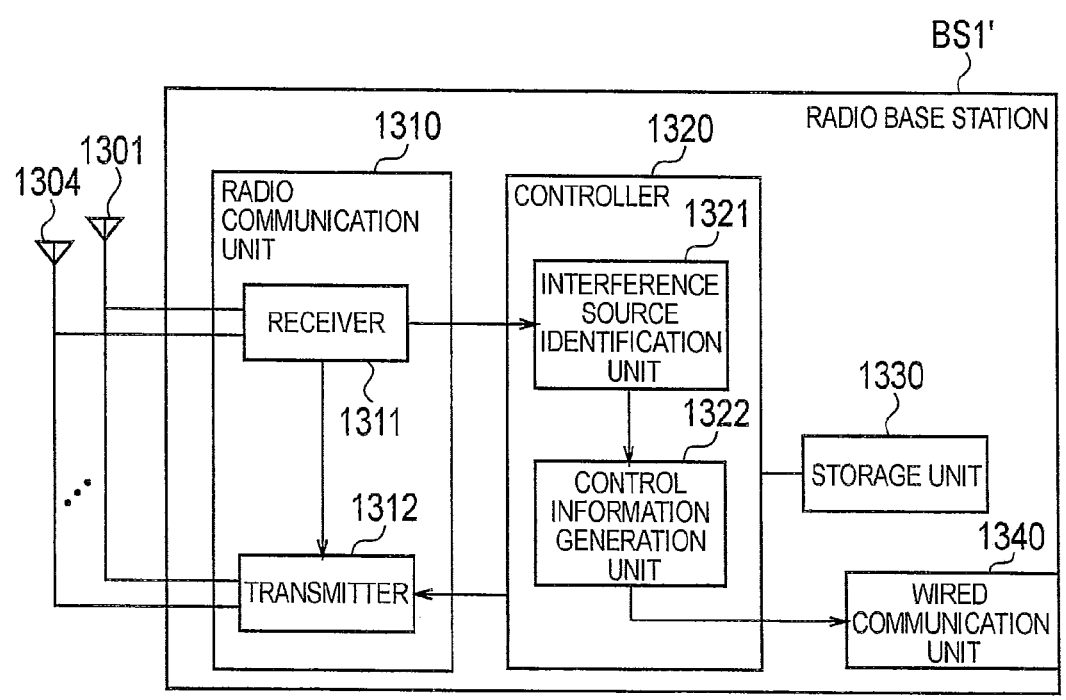
FIG. 12 is a functional block diagram showing a configuration of a radio base station (first radio base station) according to the second embodiment of the present invention.

As shown in FIG. 11, a radio base station BS2' has functions of a control device 1100B. To put it more specifically, as shown in FIG. 12, a controller 1320 of the radio base station BS2' has an interference source identification unit 1321 configured to identify an interference source, and a control information generation unit 1322 configured to generate control information. The functions of each of the interference source identification unit 1321 and the control information generation unit 1322 are the same as those of each of the interference source identification unit 1121 and the control information generation unit 1122 described in the first embodiment.

(2) Operation of Radio Communication System

Figure 13:
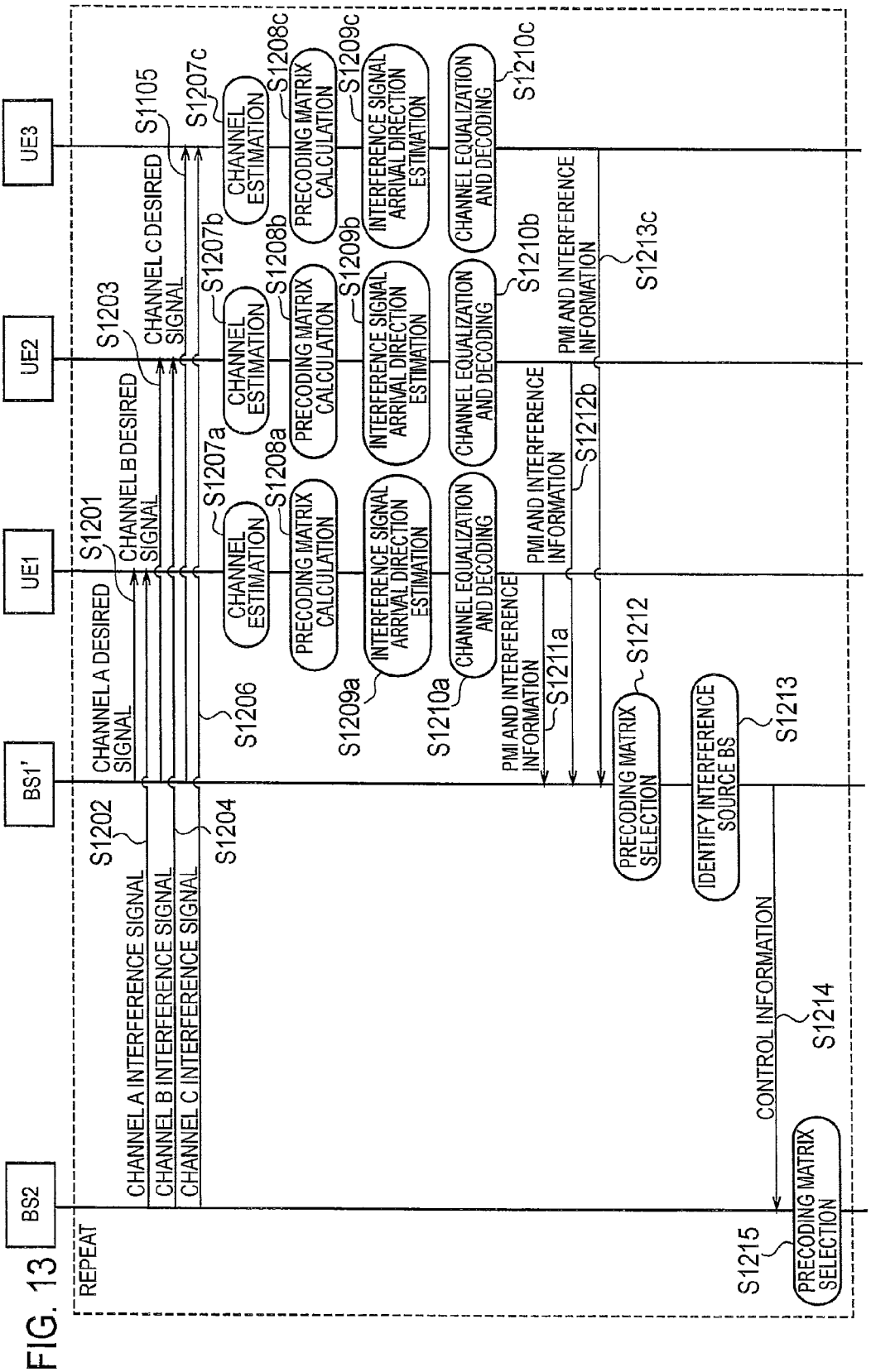
FIG. 13 is an operation sequence diagram showing an operation of the radio communication system according to the second embodiment of the present invention.

FIG. 13 is an operation sequence diagram showing an operation of the radio communication system 1010B. In FIG. 13, each processing until step S1213 is the same as the processing in the first embodiment. Thus, the processing in step S1213 and thereafter will be described herein.

In step S1213, the interference source identification unit 1321 of the radio base station BS1' identifies the radio base station BS2 as the interference source from among multiple radio base stations on the basis of the base station identification information received by the receiver 1311. The control information generation unit 1322 of the radio base station BS1' generates on the basis of the interference information received by the receiver 1311 the control information addressed to the radio base station BS2 identified by the interference source identification unit 1321.

To be more specific, the control information generation unit 322 generates the control information corresponding to the channel A (radio terminal UE1), the control information corresponding to the channel B (radio terminal UE2) and the control information corresponding to the channel C (radio terminal UE3).

In step S1214, the wired communication unit 1340 of the radio base station BS1' transmits the control information generated by the control information generation unit 1322 to the radio base station BS2. The wired communication unit 1440 of the radio base station BS2 receives the control information.

In step S1215, when the transmitter 1412 transmits the second radio signal for which the channel A is used, the transmission directivity controller 1422 controls the transmitter 1412 in such a way that the directional beam are directed to the direction D5 of the radio terminal UE5 while the null point is directed to the direction D1 of the radio terminal UE1.

Likewise, when the transmitter 1412 transmits the second radio signal for which the channel B is used, the transmission directivity controller 1422 controls the transmitter 1412 in such a way that the directional beam are directed to the radio terminal UE6 (not shown) while the null point is directed to the direction D2 of the radio terminal UE2.

In addition, when the transmitter 1412 transmits the second radio signal for which the channel C is used, the transmission directivity controller 1422 controls the transmitter 1412 in such a way that the directional beam are directed to the radio terminal UE7 (not shown) while the null point is directed to the direction D3 of the radio terminal UE3.

(3) Effects

With the radio communication system 1010B according to the second embodiment, the following effect can be obtained in addition to the effects obtained in the first embodiment. To put it more specifically, since the control device 1100B does not have to be provided separately, the installation cost of the control device 1100B can be reduced.

[Other Embodiments According to First and Second Embodiments]

Each of the modification examples 1 to 3 of the first embodiment is applicable not only to the first embodiment but also the second embodiment.

In the aforementioned first and second embodiments, when each of the radio terminals UE1 to UE3 receives a second radio signal from the radio base station BS2, the second radio signal is considered as an interference signal, but a second radio signal having a reception level less than a predetermined reception level may be tolerated. In this case, when each of the radio terminals UE1 to UE3 receives a second radio signal from the radio base station BS2, and the reception level of the second radio signal is equal to or greater than the predetermined reception level, the second radio signal is considered as an interference signal.

In the aforementioned first and second embodiments, the FDD scheme is employed as a duplex scheme, but a time division duplex (TDD) scheme may be employed.

In the aforementioned first and second embodiments, the configuration in which four transmission antennas and two reception antennas are provided (4×2 MIMO) in the downlink communications is described. However, a configuration in which a single reception antenna is provided in the downlink communications, i.e., a configuration in which multiple-antenna transmission of multiple-input single-output (MISO) is performed may be employed as well.

In the aforementioned first and second embodiments, each of the radio base stations BS1 and BS2 performs radio communications with multiple radio terminals, but a configuration in which each of the radio base stations BS1 and BS2 performs radio communications with a single radio terminal may be employed as well.

In the aforementioned first and second embodiments, the radio communication systems 1010A and 1010B based on the LTE standard are described, but the present invention is applicable not only to the radio communication systems based on the LTE standard, but also a radio communication system based on the WiMAX standard (IEEE 802.16) or the UMB (Ultra Mobile Broadband) standard, which is standardized in 3GPP2, or the like as well.

[Third Embodiment]

In the third embodiment, a description will be given of (1) Summary of Radio Communication System, (2) Detailed Configuration of Radio Communication System, (3) Transmission Directivity Control in Radio Terminal, (4) Operation of Radio Communication System, and (5) Effects.

(1) Summary of Radio Communication System

A description will be given of a summary of a radio communication system according to the third embodiment in the order of (1.1) Schematic Configuration of Radio Communication System and (1.2) Schematic Operation of Radio Communication System.

(1.1) Schematic Configuration of Radio Communication System

Figure 14:
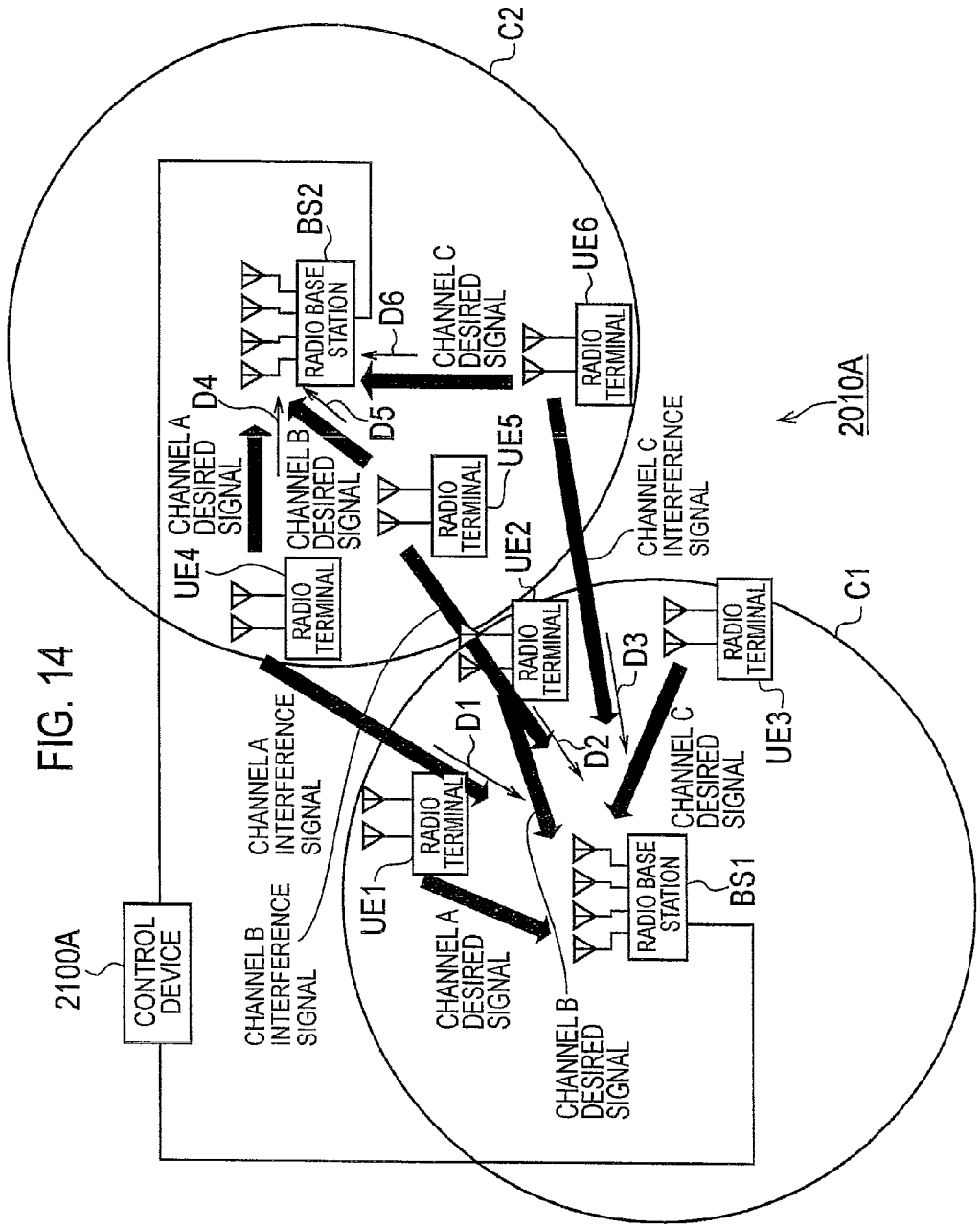
FIG. 14 is an overall configuration diagram of a radio communication system according to a third embodiment of the present invention.

FIG. 14 is an overall configuration diagram of the radio communication system 2010A according to the third embodiment.

As shown in FIG. 14, the radio communication system 2010A includes a radio terminal UE1 (first radio terminal), a radio terminal UE2, a radio terminal UE3, a radio terminal UE4 (second radio terminal), a radio terminal UE5, a radio terminal UE6, a radio base station BS1 (first radio base station), a radio base station BS2 (second radio base station), and a control device 2100A.

In FIG. 14, only the radio base station BS1 and the radio base station BS2 are illustrated for the convenience of description, but a radio base station is further provided adjacent to each of the radio base station BS1 and the radio base station BS2.

The radio communication system 2010A has a configuration based on the LTE (Long Term Evolution) standard, which is standardized in 3GPP (3rd Generation Partnership Project). Hereinafter, a description will be mainly given of upstream (hereinafter, "uplink") communications.

The radio base station BS1 is a connection destination of the radio terminals UE1 to UE3 located within a cell C1 and performs uplink communications with the radio terminals UE1 to UE3. The radio terminals UE1 to UE3 are movable and located at an end portion of the cell C1 in the example shown in FIG. 14. A radio terminal other than the radio terminals UE1 to UE3 may be further connected to the radio base station BS1.

The radio base station BS2 is a connection destination of the radio terminals UE4 to UE6 located within a cell C2 adjacent to the cell C1 and performs uplink communications with the radio terminals UE4 to UE6. The radio terminals UE4 to UE6 are movable and located at an end portion of the cell C2 in the example shown in FIG. 14. A radio terminal other than the radio terminals UE4 to UE6 may be further connected to the radio base station BS2.

The control device 2100A is provided on a backbone network, which is a wired communication network. The control device 2100A is wire-connected to the radio base station BS1 and the radio base station BS2. The control device 2100A controls the radio base station BS1 and the radio base station BS2. The control device 2100A may control a radio base station adjacent to each of the radio base station BS1 and the radio base station BS2 in addition to the radio base station BS1 and the radio base station BS2. The control device 2100A periodically collects information from the radio base station BS1, the radio base station BS2 and the other radio base stations and then stores and manages the collected information.

The radio communication system 2010A employs an orthogonal frequency division multiple access (OFDMA) scheme, which is one of multi-carrier communication schemes. In the OFDMA scheme, a communication channel called a subchannel is formed by use of multiple subcarriers (hereinafter, a "channel"), and then, a radio base station allocates the channel to a radio terminal. In addition, the radio communication system 2010A employs a frequency division duplex (FDD) scheme as a duplex system.

Figure 15:
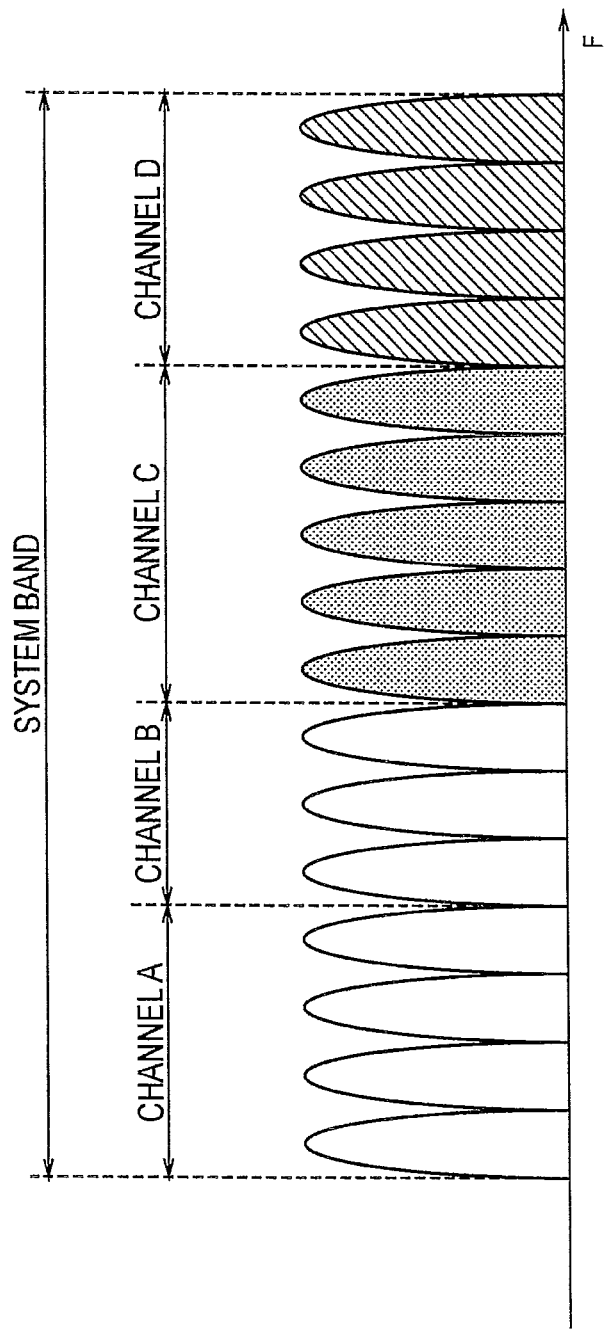
FIG. 15 is a diagram for describing channels used in the radio communication system according to the third embodiment of the present invention.

The radio base station BS1 allocates channels A, B, and C shown in FIG. 15 to the radio terminals UE1, UE2, and UE3, respectively. Hereinafter, a radio signal transmitted by each of the radio terminals UE1 to UE3 by use of the channel allocated by the radio base station BS1 is appropriately termed as a "first radio signal."

The radio base station BS2 allocates channels A, B, and C shown in FIG. 15 to the radio terminals UE4, UE5, and UE6, respectively. Hereinafter, a radio signal transmitted by each of the radio terminals UE4 to UE6 by use of the channel allocated by the radio base station BS2 is appropriately termed as a "second radio signal."

The radio base station BS1 receives a first radio signal for which the channel A is used from the radio terminal UE1 as a desired signal and also receives a second radio signal for which the channel A is used from the radio terminal UE4 as an interference signal. The second radio signal for which the channel A is used travels in the direction D1 from the radio terminal UE3 and arrives at the radio base station BS1, as well as travels in the direction D4 from the radio terminal UE4 and arrives at the radio base station BS2.

Likewise, the radio base station BS1 receives a first radio signal for which the channel B is used from the radio terminal UE2 as a desired signal and also receives a second radio signal for which the channel B is used from the radio terminal UE5 as an interference signal. The second radio signal for which the channel B is used travels in the direction D2 from the radio terminal UE5 and arrives at the radio base station BS1, as well as travels in the direction D5 from the radio terminal UE5 and arrives at the radio base station BS2.

The radio base station BS1 receives a first radio signal for which the channel C is used from the radio terminal UE3 as a desired signal and also receives a second radio signal for which the channel C is used from the radio terminal UE6 as an interference signal. The second radio signal for which the channel C is used travels in the direction D3 from the radio terminal UE6 and arrives at the radio base station BS1, as well as travels in the direction D6 from the radio terminal UE6 and arrives at the radio base station BS2.

The radio base station BS1 and the radio terminals UE1 to UE3 perform uplink communications based on the closed loop MIMO. The radio base station BS2 and the radio terminals UE4 to UE6 perform uplink communications based on the closed loop MIMO.

To put it more specifically, each of the radio terminals UE1 to UE3 transmits the first radio signal to the radio base station BS1 via multiple antennas (transmission antennas). The radio base station BS1 receives each of the first radio signals via multiple antennas (reception antennas).

Each of the radio terminals UE4 to UE6 transmits the second radio signal to the radio base station BS2 via multiple antennas (transmission antennas). The radio base station BS2 receives each of the second radio signals via multiple antennas (reception antennas).

FIG. 14 exemplifies MIMO in which two transmission antennas and four reception antennas are provided (so called, 2×4 MIMO) in the uplink communications.

The radio base station BS1 analyzes the first radio signal received from each of the radio terminals UE1 to UE3 and then periodically sends the radio terminals UE1 to UE3 the feedback information for adaptively controlling multiple-antenna transmission in the radio terminals UE1 to UE3.

In the LTE standard, the feedback information includes an "RI (Rank Indicator)," a "PMI (Precoding Matrix Indicator)," and a "CQI" (Channel Quality Indicator). The RI is information for controlling the number of streams, which are signal sequences (termed as "layers" in the LTE standard). The PMI is information for controlling a transmission antenna weight (termed as a "precoding matrix" in the LTE standard). The CQI is information for controlling a transmission power and a modulation scheme.

The radio base station BS1 determines the number of layers for each of the radio terminals UE1 to UE3 and transmits an RI corresponding to the determined number of layers as the feedback information. The radio base station BS1 calculates for each of the radio terminals UE1 to UE3 a precoding matrix with which the reception quality (such as an SNR) becomes the largest, in accordance with the number of layers and then transmits a PMI corresponding to the calculation result as the feedback information. In addition, the radio base station BS1 finds a CQI corresponding to the reception quality of each of the radio terminals UE1 to UE3 and then transmits the CQI as the feedback information. Each of the radio terminals UE1 to UE3 controls the number of layers, the directional beam, the transmission power and the modulation scheme in accordance with the feedback information fed back from the radio base station BS1.

Likewise, the radio base station BS2 analyzes the second radio signal received from each of the radio terminals UE4 to UE6 and then periodically sends the radio terminals UE4 to UE6 the feedback information (RI, PMI, CQI) for adaptively controlling multiple-antenna transmission in the radio terminals UE4 to UE6. Each of the radio terminals UE4 to UE6 controls the number of layers, the directional beam, the transmission power and the modulation scheme in accordance with the feedback information fed back from the radio base station BS2.

(1.2) Schematic Operation of Radio Communication System

Figure 16:
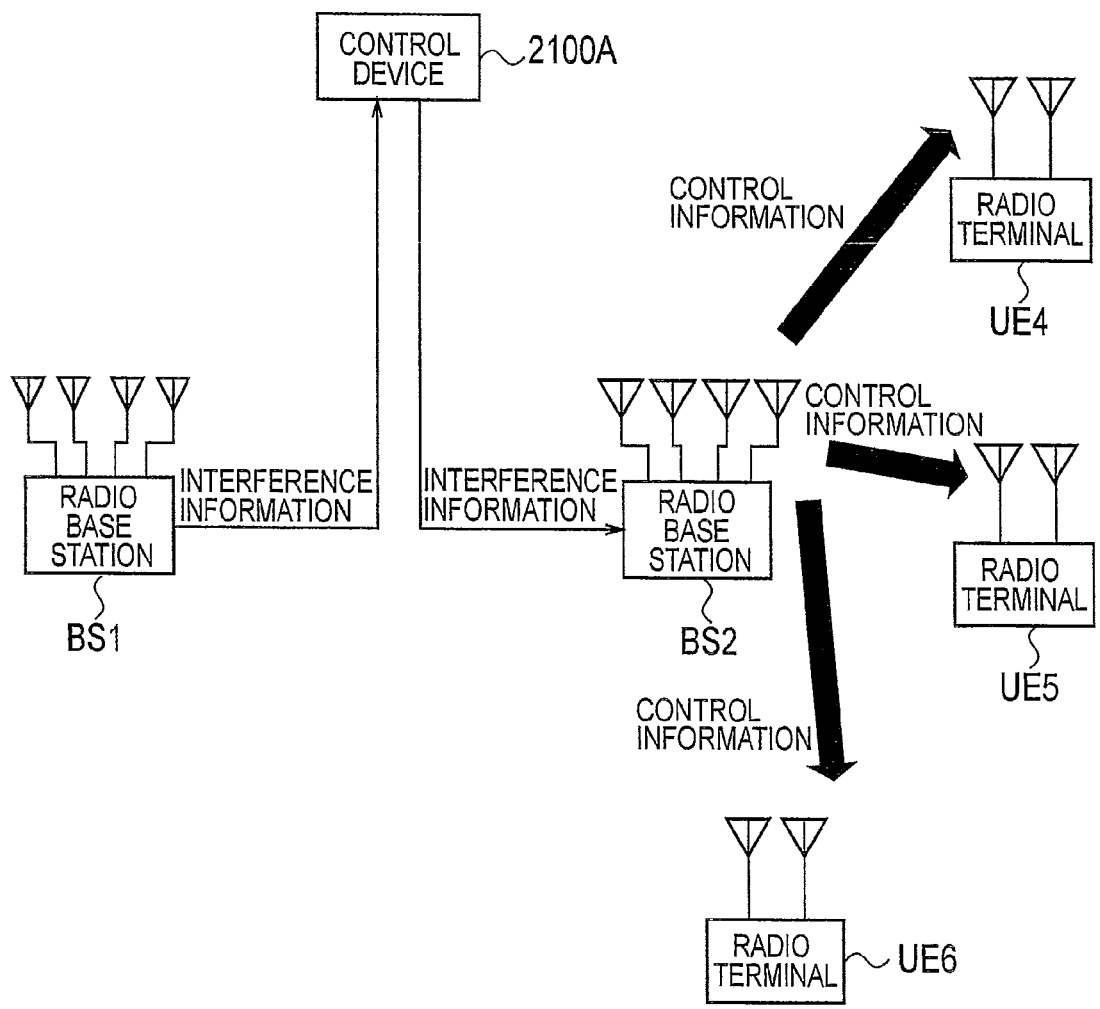
FIG. 16 is a diagram for describing a schematic operation of the radio communication system according to the third embodiment of the present invention.
Figure 17:
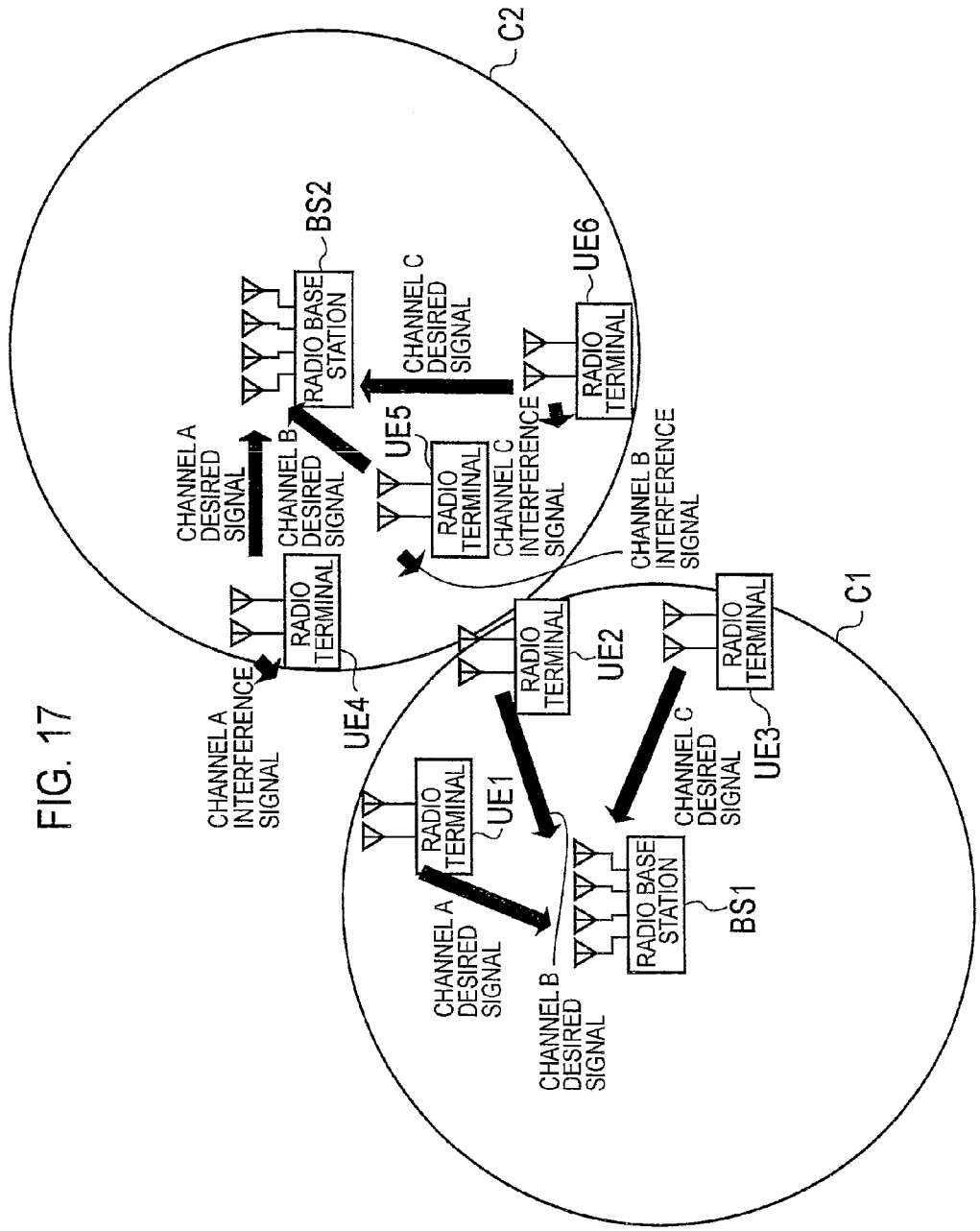
FIG. 17 is another diagram for describing the schematic operation of the radio communication system according to the third embodiment of the present invention.

Next, a description will be given of a schematic operation of the radio communication system 2010A with reference to FIG. 14, FIG. 16 and FIG. 17.

Upon receipt of the second radio signal for which the channel A is used from the radio terminal UE4 as an interference signal, the radio base station BS1 estimates the arrival direction D1 of the second radio signal to the radio base station BS1. As shown in FIG. 16, the radio base station BS1 generates interference information based on the arrival direction D1 and then transmits the generated interference information to the control device 2100A.

In addition, upon receipt of the second radio signal for which the channel B is used from the radio terminal UE5 as an interference signal, the radio base station BS1 estimates the arrival direction D2 of the second radio signal to the radio base station BS1. The radio base station BS1 generates interference information based on the arrival direction D2 and then transmits the generated interference information to the control device 2100A.

Upon receipt of the second radio signal for which the channel C is used from the radio terminal UE6 as an interference signal, the radio base station BS1 estimates the arrival direction D3 of the second radio signal to the radio base station BS1. The radio base station BS1 generates interference information based on the arrival direction D3 and then transmits the generated interference information to the control device 2100A.

The control device 2100A identifies the radio base station BS2 from among multiple radio base stations including the radio base station BS2 on the basis of the information on the second radio signal and then transmits the interference information to the identified radio base station BS2. The information on the second radio signal is information included in the second radio signal or information for identifying the channel used for the second radio signal.

Upon receipt of the interference signal, the radio base station BS2 transmits control information to the radio terminals UE4 to UE6 on the basis of the received interference information. To be more specific, the radio base station BS2 sends the radio terminal UE4 the control information for directing a null point (dead spot) of the directional beam formed by the radio terminal UE4 to the direction D1 of the radio base station BS1. The radio base station BS2 sends the radio terminal UE5 the control information for directing a null point of the directional beam formed by the radio terminal UE5 to the direction D2 of the radio base station BS1. The radio base station BS2 sends the radio terminal UE6 the control information for directing a null point of the directional beam formed by the radio terminal UE6 to the direction D3 of the radio base station BS1.

Note that, the communication form in which MIMO communications are performed while the directional beam are formed is generally termed as "beam forming MIMO."

The radio terminal UE4 transmits the second radio signal for which the channel A is used, while directing the null point to the direction D1 of the radio base station BS1 and also directing the directional beam to the direction D4 of the radio base station BS2 on the basis of the control information received from the radio base station BS2 and the PMI fed back from the radio base station BS2. Since the radio terminal UE4 directs the null point to the direction D1 of the radio base station BS1, the radio base station BS1 can avoid receiving the second radio signal from the radio terminal UE4 as shown in FIG. 17.

The radio terminal UE5 transmits the second radio signal for which the channel A is used, while directing the null point to the direction D2 of the radio base station BS1 and also directing the directional beam to the direction D5 of the radio base station BS2 on the basis of the control information received from the radio base station BS2 and the PMI fed back from the radio base station BS2. Since the radio terminal UE5 directs the null point to the direction D2 of the radio base station BS1, the radio base station BS1 can avoid receiving the second radio signal from the radio terminal UE5 as shown in FIG. 17.

The radio terminal UE6 transmits the second radio signal for which the channel C is used, while directing the null point to the direction D3 of the radio base station BS1 and also directing the directional beam to the direction D6 of the radio base station BS2 on the basis of the control information received from the radio base station BS2 and the PMI fed back from the radio base station BS2. Since the radio terminal UE6 directs the null point to the direction D3 of the radio base station BS1, the radio base station BS1 can avoid receiving the second radio signal from the radio terminal UE6 as shown in FIG. 17.

Note that, the interference information is information on the coefficient or angle indicating the arrival direction of the interference signal. An existing arrival direction estimation technique can be used in the estimation of the arrival direction. For the purpose of reducing the information amount of the interference information, the information on the coefficient or angle indicating the arrival direction may be converted into a PMI and then, the PMI obtained by conversion may be used as the interference information. In this case, the radio base station BS1 or the control device 2100A sends the radio base station BS2, the PMI corresponding to the precoding matrix for directing the null point to the direction D1, the PMI corresponding to the precoding matrix for directing the null point to the direction D2 and the PMI corresponding to the precoding matrix for directing the null point to the direction D3 as the interference information.

In a case where the information on the coefficient or angle indicating the arrival direction is used as the interference information, the information on the coefficient or angle indicating the arrival direction may be used as the control information without any change, or the information may be converted into a PMI and used as the interference information. In a case where a PMI is used as the interference information, the PMI can be used as the control information without any change.

The use of a PMI as the interference information and the control information allows a reduction in the information amount of the interference information and the control information, thereby, making it possible to facilitate implementation in the radio communication system 2010A.

Note that, for the purpose of corresponding to a change in the states of the radio terminals UE4 to UE6, means for detecting an absolute direction (orientation) such as a GPS or a direction sensor may be provided to each of the radio terminals UE4 to UE6, and then, the detected absolute direction may be used in combination with the control information.

(2) Detailed Configuration of Radio Communication System

Next, a description will be given of a detailed configuration of the radio communication system 2010A in the order of (2.1) Configuration of Radio Base Station BS1, (2.2) Configuration of Control device 2100A, (2.3) Configuration of Radio Base Station BS2 and (2.4) Configuration of Radio Terminal UE4. Note that, a description will be mainly given of the configuration related to the present invention below.

(2.1) Configuration of Radio Base Station BS1

Figure 18:
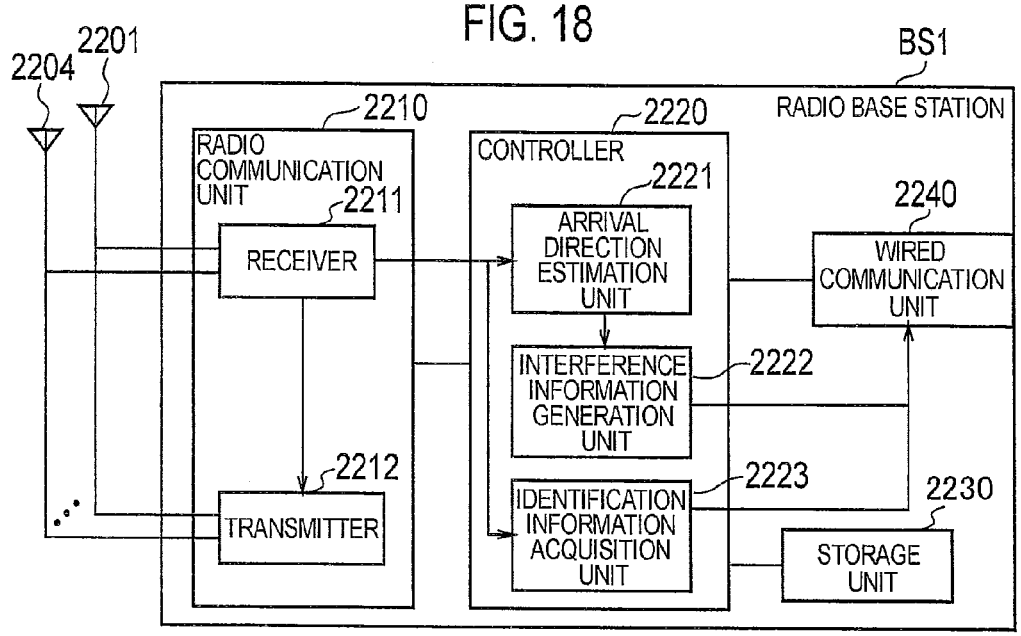
FIG. 18 is a functional block diagram showing a configuration of a radio base station (first radio base station) according to the third embodiment of the present invention.

FIG. 18 is a functional block diagram showing a configuration of the radio base station BS1.

As shown in FIG. 18, the radio base station BS1 includes antennas 2201 to 2204, a radio communication unit 2210, a controller 2220, a storage unit 2230 and a wired communication unit 2240.

The radio communication unit 2210 has a receiver 2211 configured to receive a radio signal via the antennas 2201 to 2204, and a transmitter 2212 configured to transmit a radio signal via the antennas 2201 to 2204. The receiver 2211 performs channel estimation for each of the radio terminals UE1 to UE3 on the basis of the pilot signal, which is a known signal included in the received radio signal. Then, the receiver 2211 generates feedback information (RI, PMI, CQI) by use of the result of the channel estimation. The transmitter 2212 transmits the feedback information to each of the radio terminals UE1 to UE3.

The controller 2220 is configured of a CPU, for example, and configured to control various functions included in the radio base station BS1. The storage unit 2230 is configured of a memory, for example, and configured to store therein various types of information used in control or the like in the radio base station BS1. The wired communication unit 2240 is connected to the control device 2100A via a wired communication network.

The controller 2220 has an arrival direction estimation unit 2221, an interference information generation unit 2222 and an identification information acquisition unit 2223.

The arrival direction estimation unit 2221 is configured to estimate an arrival direction of a second radio signal to the radio base station BS1 by use of an arrival direction estimation technique in a case where the receiver 2211 receives the second radio signal (interference signal).

The interference information generation unit 2222 is configured to generate interference information based on the arrival direction estimated by the arrival direction estimation unit 2221. In a case where a PMI is used as the interference information as described above, the storage unit 2230 previously holds therein an association between the arrival direction and the PMI, and the interference information generation unit 2222 generates (acquires) the PMI from the association.

The identification information acquisition unit 2223 is configured to acquire information on the second radio signal received by the receiver 2211 as identification information. The identification information is information for identifying an interference source radio terminal (hereinafter, an "interference source terminal") and a radio base station to which the interference source terminal is connected. The identification information acquisition unit 2223 acquires the identification information by use of any one of the following methods (a1) to (c1) or a combination of the methods.

Method (a1): the identification information acquisition unit 2223 acquires terminal identification information (terminal ID) included in the second radio signal received by the receiver 2211 as the identification information. The terminal identification information is information for identifying a transmission source radio terminal of the second radio signal.

Method (b1): the identification information acquisition unit 2223 acquires channel identification information for identifying a channel used for the second radio signal received by the receiver 2211 as the identification information.

Method (c1): the identification information acquisition unit 2223 acquires the identification information from the pilot signal included in the second radio signal received by the receiver 2211. To be more specific, the pilot signal includes a cell specific orthogonal sequence, and the identification information acquisition unit 2223 acquires the orthogonal sequence as the identification information.

The wired communication unit 2240 transmits the interference information generated by the interference information generation unit 2222, and the identification information acquired by the identification information acquisition unit 2223 to the control device 2100A. In the third embodiment, the wired communication unit 2240 forms an interference information transmitter configured to transmit the interference information.

(2.2) Configuration of Control Device 2100A

Figure 19:
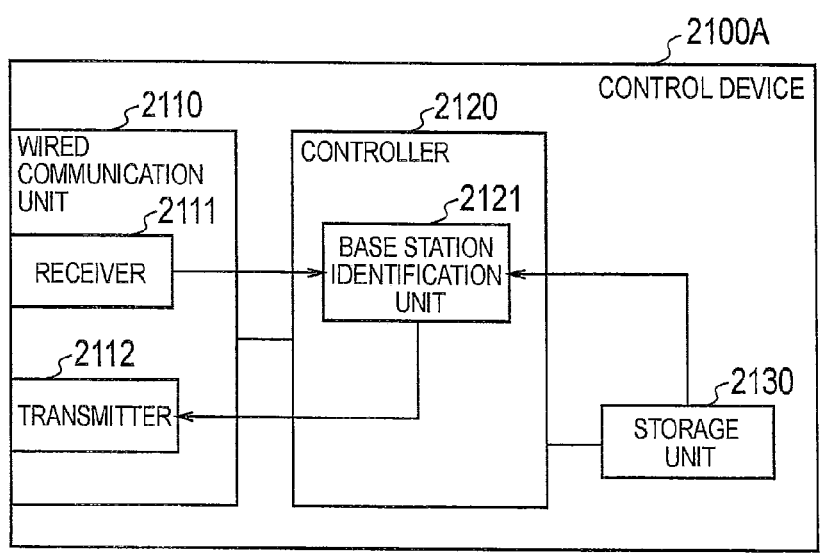
FIG. 19 is a functional block diagram showing a configuration of a control device according to the third embodiment of the present invention.

FIG. 19 is a functional block diagram showing a configuration of the control device 2100A.

As shown in FIG. 19, the control device 2100A includes a wired communication unit 2110, a controller 2120 and a storage unit 2130.

The wired communication unit 2110 is connected to the radio base station BS1 and the radio base station BS2 via a wired communication network.

The wired communication unit 2110 has a receiver 2111 configured to receive a signal and a transmitter 2112 configured to transmit a signal. The receiver 2111 receives the interference information and identification information from the radio base station BS1.

The controller 2120 is configured of a CPU, for example, and configured to control various functions included in the control device 2100A. The storage unit 2130 is configured of a memory, for example, and configured to store various types of information used in control or the like in the control device 2100A.

The controller 2120 has a base station identification unit 2121. The base station identification unit 2121 is configured to identify a radio base station to which the interference source terminal is connected from among multiple radio base stations on the basis of the identification information received by the wired communication unit 2110. The base station identification unit 2121 identifies the radio base station to which the interference source terminal is connected, by use of any one of the following methods (a2) to (c2) or a combination of the methods.

Method (a2): in a case where the terminal identification information is used as the identification information, the base station identification unit 2121 identifies the radio base station to which the interference source terminal is connected, by use of connection information stored in the storage unit 2130. The connection information is information associating the terminal identification information on a radio terminal connected to any of the radio base station BS2 and the other radio base stations with the radio base station to which this radio terminal is connected. The base station identification unit 2121 identifies the radio base station corresponding to the terminal identification information received by the receiver 2111 as the radio base station to which the interference source terminal is connected.

Method (b2): in a case where the channel identification information is used as the identification information, the base station identification unit 2121 identifies the radio base station to which the interference source terminal is connected, by use of channel information stored in the storage unit 2130. The channel information is information associating the channel identification information of a channel used for uplink communications by the radio terminal connected to any of the radio base station BS2 and the other radio base stations with the radio base station to which this radio terminal is connected. The base station identification unit 2121 identifies the radio base station corresponding to the channel identification information received by the receiver 2111 as the radio base station to which the interference source terminal is connected.

Method (c2): in a case where the cell specific orthogonal sequence is used as the identification information, the base station identification unit 2121 identifies the radio base station corresponding to the cell specific orthogonal sequence as the radio base station to which the interference source terminal is connected.

The transmitter 2112 transmits the interference information or the identification information to the radio base station identified by the base station identification unit 2121 (which corresponds to the radio base station BS2 in the third embodiment).

(2.3) Configuration of Radio Base Station BS2

Figure 20:
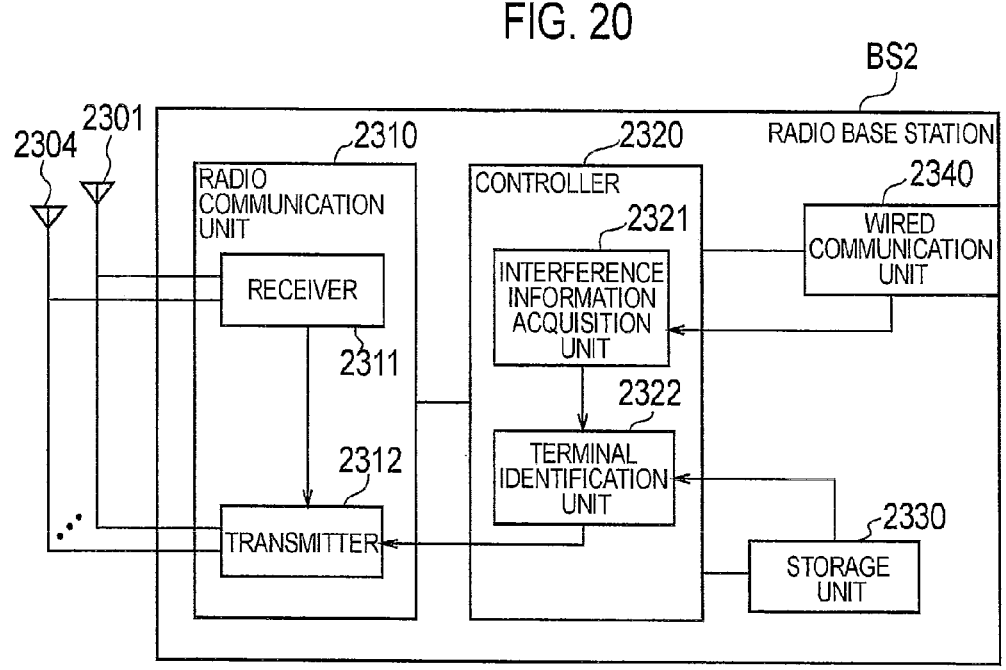
FIG. 20 is a functional block diagram showing a configuration of a radio base station (second radio base station) according to the third embodiment of the present invention.

FIG. 20 is a functional block diagram showing a configuration of the radio base station BS2.

As shown in FIG. 20, the radio base station BS2 includes antennas 2301 to 2304, a radio communication unit 2310, a controller 2320 and a storage unit 2330 and a wired communication unit 2340.

The radio communication unit 2310 has a receiver 2311 configured to receive radio signals from the radio terminals UE4 to UE6 via the antennas 2301 to 2304, and a transmitter 2312 configured to transmit radio signals to the radio terminals UE4 to UE6 via the antennas 2301 to 2304.

The receiver 2311 performs channel estimation for each of the radio terminals UE4 to UE6 on the basis of the pilot signal, which is a known signal included in the received radio signal. Then, the receiver 2311 generates feedback information (RI, PMI, CQI) by use of the result of the channel estimation. The transmitter 2312 transmits the feedback information to each of the radio terminals UE4 to UE6.

The controller 2320 is configured of a CPU, for example, and configured to control various functions included in the radio base station BS1. The storage unit 2330 is configured of a memory, for example, and configured to store various types of information used in control or the like in the radio base station BS1. The wired communication unit 2340 is connected to the control device 2100A via a wired communication network. The wired communication unit 2340 receives the interference information and identification information from the control device 2100A.

The controller 2320 has an interference information acquisition unit 2321 and a terminal identification unit 2322.

The interference information acquisition unit 2321 is configured to acquire the interference information received by the wired communication unit 2340 from the control device 2100A. The terminal identification unit 2322 is configured to identify the interference source terminal from among multiple radio terminals connected to the radio base station BS2 by use of the identification information received by the wired communication unit 2340 from the control device 2100A. The terminal identification unit 2322 identifies the interference source terminal by use of any one of the following methods (a3) and method (b3) or a combination of the methods.

Method (a3): in a case where the terminal identification information is used as the identification information, the terminal identification unit 2322 identifies the radio terminal indicated by the terminal identification information as the interference source terminal from among multiple radio terminals connected to the radio base station BS2.

Method (b3): in a case where the channel identification information is used as the identification information, the terminal identification unit 2322 identifies the radio terminal using the channel indicated by the channel identification information for uplink communications as the interference source terminal from among multiple radio terminals connected to the radio base station BS2.

The transmitter 2312 transmits the aforementioned control information to the interference source terminal identified by the terminal identification unit 2322 (which corresponds to the radio terminals UE4 to UE6 in the third embodiment).

(2.4) Configuration of Radio Terminal UE4

Figure 21:
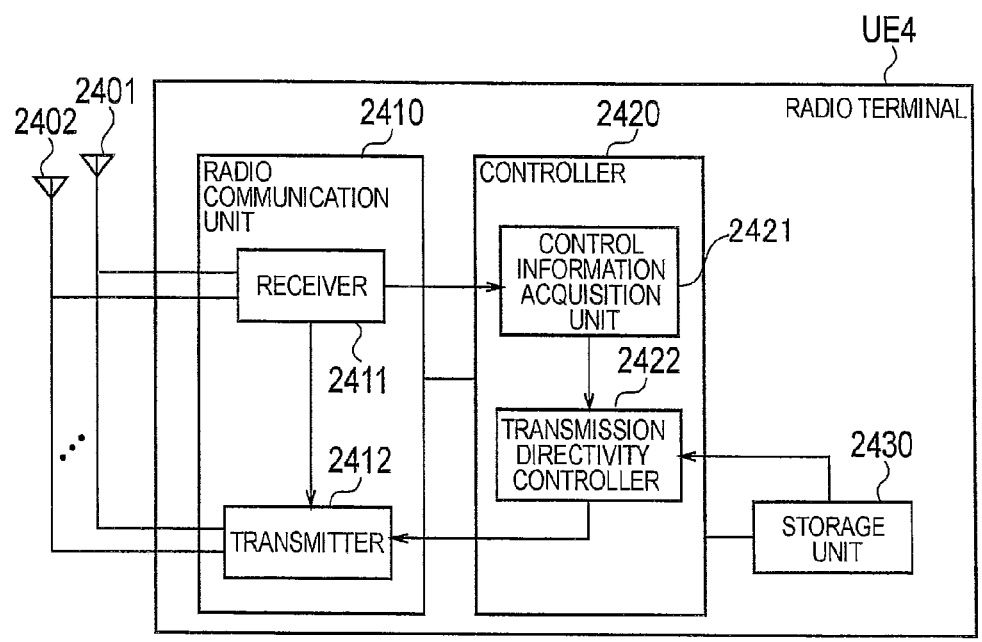
FIG. 21 is a functional block diagram showing a configuration of a radio terminal according to the third embodiment of the present invention.

FIG. 21 is a functional block diagram showing a configuration of the radio terminal UE4. The other radio terminals (radio terminals UE1 to UE3, UE5 and UE6) are configured in the same manner as the radio terminal UE4. Accordingly, the radio terminal UE4 will be described herein as the representative of the radio terminals.

As shown in FIG. 21, the radio terminal UE4 includes antennas 2401 and 2402, a radio communication unit 2410, a controller 2420 and a storage unit 2430.

The radio communication unit 2410 has a receiver 2411 configured to receive a radio signal from the radio base station BS2 via the antennas 2401 and 2402, and a transmitter 2412 configured to transmit a radio signal to the radio base station BS2 via the antennas 2401 and 2402. The radio signal received by the receiver 2411 from the radio base station BS2 includes the feedback information and the control information.

The transmitter 2412 controls multiple-antenna transmission on the basis of the feedback information received by the receiver 2411. To be more specific, the transmitter 2412 distributes the transmission signal into multiple layers in accordance with the RI, then weights the transmission signals of the respective layers (hereinafter, "precoding") and then performs adaptive modulation and transmission power control for the transmission signals in accordance with the CQI after the precoding.

The controller 2420 is configured of a CPU, for example, and configured to control various functions included in the radio terminal UE4. The storage unit 2430 is configured of a memory, for example, and configured to store various types of information used in control or the like in the radio terminal UE4.

The controller 2420 has a control information acquisition unit 2421 and a transmission directivity controller 2422. The control information acquisition unit 2421 forms an acquisition unit configured to acquire the control information for directing the null point of a directional beam to the direction D1 of the radio base station BS1 receiving as the interference signal the second radio signal transmitted by the transmitter 2412.

The transmission directivity controller 2422 forms a controller configured to control the directional beam formed by the antennas 2401 and 2402 on the basis of the PMI in the feedback information. To be more specific, the precoding using the precoding matrix corresponding to the PMI fed back from the radio base station BS2 make it possible to direct the directional beam formed by the antennas 2401 and 2402 to the direction D4 of the radio base station BS2.

Furthermore, the transmission directivity controller 2422 directs the directional beam to the direction D4 of the radio base station BS2 while directing the null point to the directions D1 of the radio base station BS1 on the basis of the feedback information and the control information acquired by the information acquisition unit 2421.

(3) Transmission Directivity Control in Radio Terminal

Figure 22:
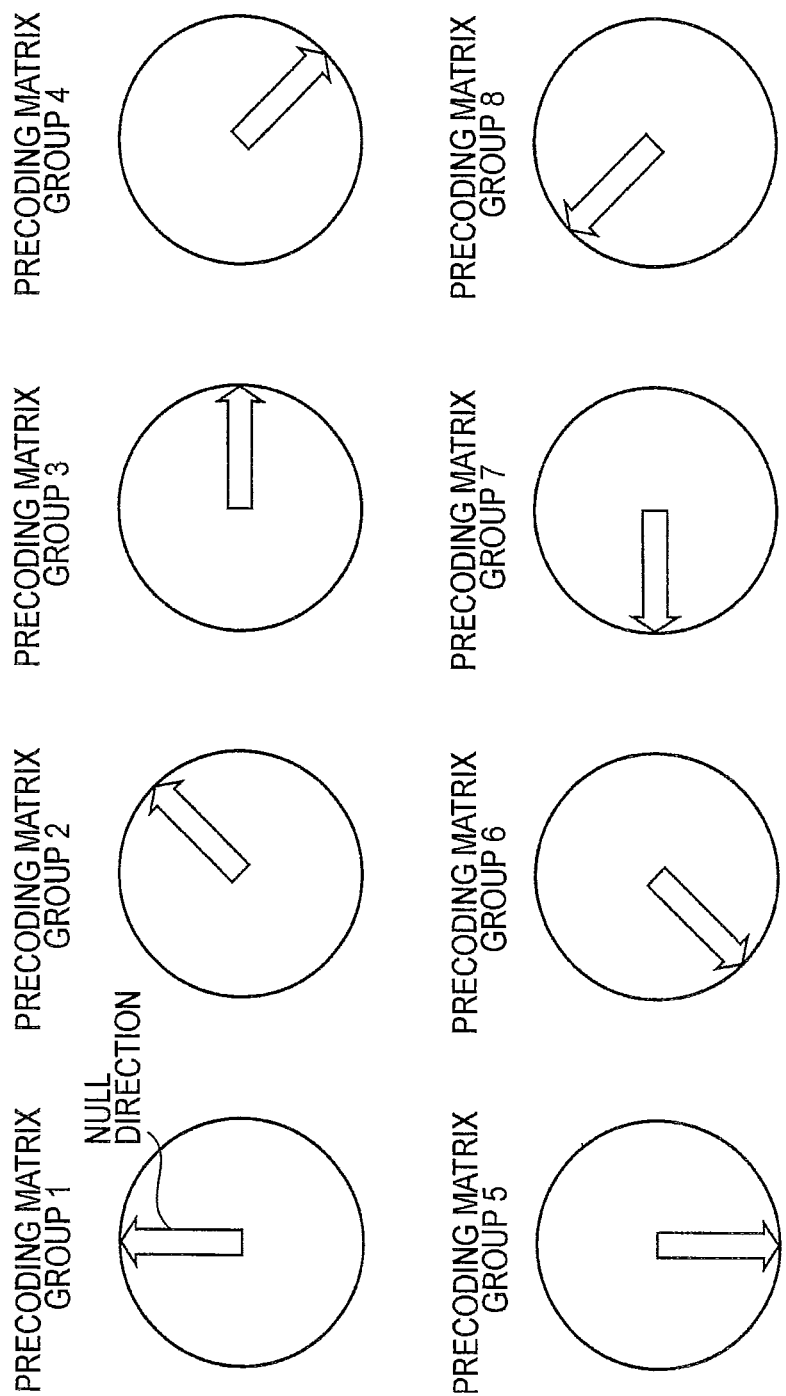
FIG. 22 is a diagram for describing details of transmission directivity control performed in the third embodiment of the present invention.

Next, the transmission directivity control performed by the transmission directivity controller 2422 will be described in detail with reference to FIG. 22 and FIG. 23. Here, a description will be given with an example of a case where the null point is directed to the direction D1 of the radio base station BS1.

The transmission directivity controller 2422 is configured to select a precoding matrix group for directing the null point to the direction D1 of the radio base station BS1. As shown in FIG. 22, precoding matrix groups are groups each formed of multiple precoding matrices each having a null point in the same direction. The precoding matrix groups are previously stored in the storage unit 2430 of the radio terminal UE4. The example shown in FIG. 22 illustrates precoding matrix groups 1 to 8 having the null points in different directions, respectively.

Figure 23:
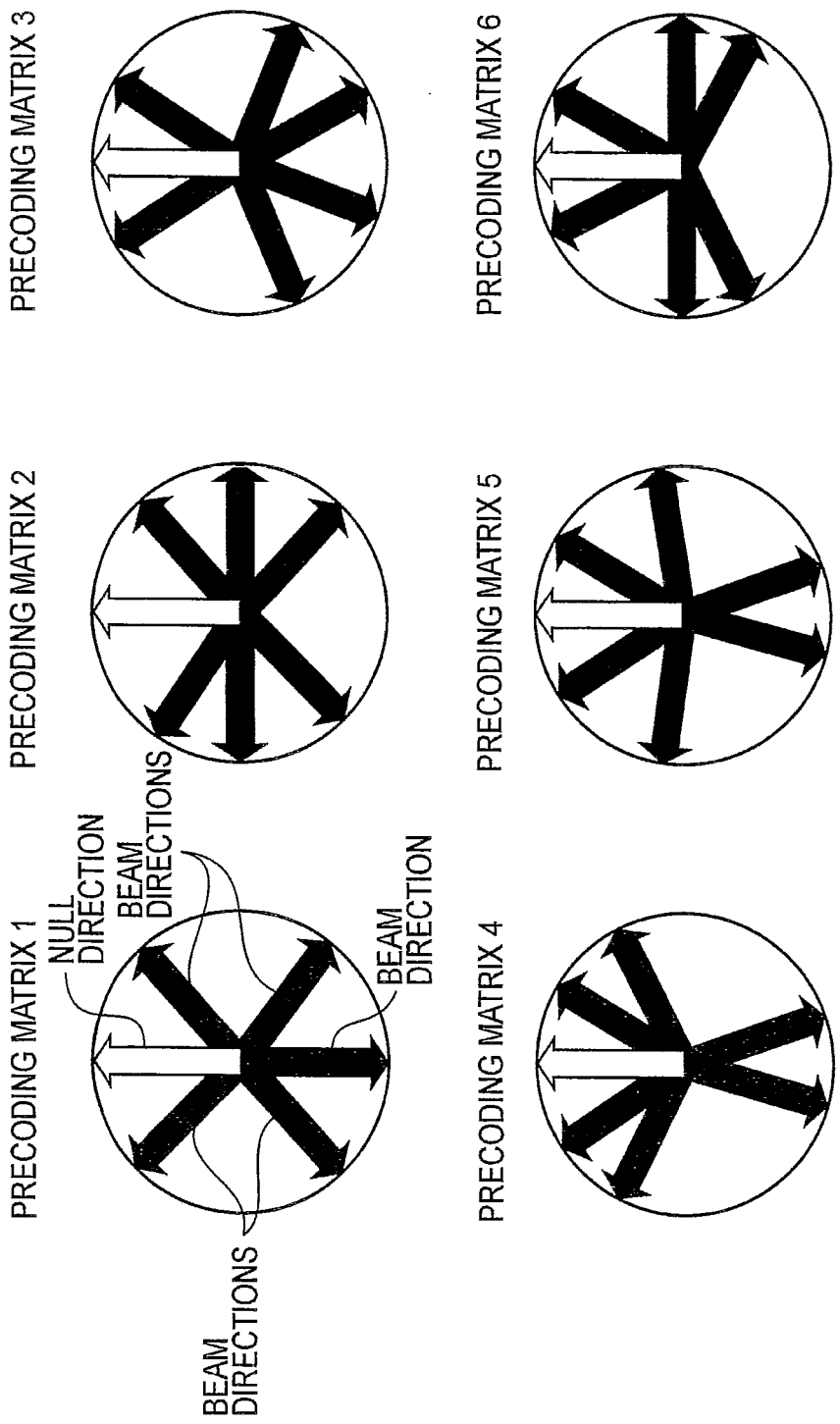
FIG. 23 is another diagram for describing the details of transmission directivity control performed in the third embodiment of the present invention.

As shown in FIG. 23, each of the precoding matrix groups has multiple precoding matrices each having directional beams in different directions. In the example shown in FIG. 23, each of the precoding matrices 1 to 6 included in the precoding matrix group 1 has a directional beam in six directions. The patterns of the directional beams of the respective precoding matrices 1 to 6 are different.

The transmission directivity controller 2422 selects on the basis of the feedback information fed back from the radio base station BS2, a precoding matrix having a directional beam in the direction D4 of the radio base station BS2 in the precoding matrix group having the null point in the direction D1 of the radio base station BS1. The selected precoding matrix is applied to the precoding in the transmitter 2412 of the radio terminal UE4.

(4) Operation of Radio Communication System

Figure 24:
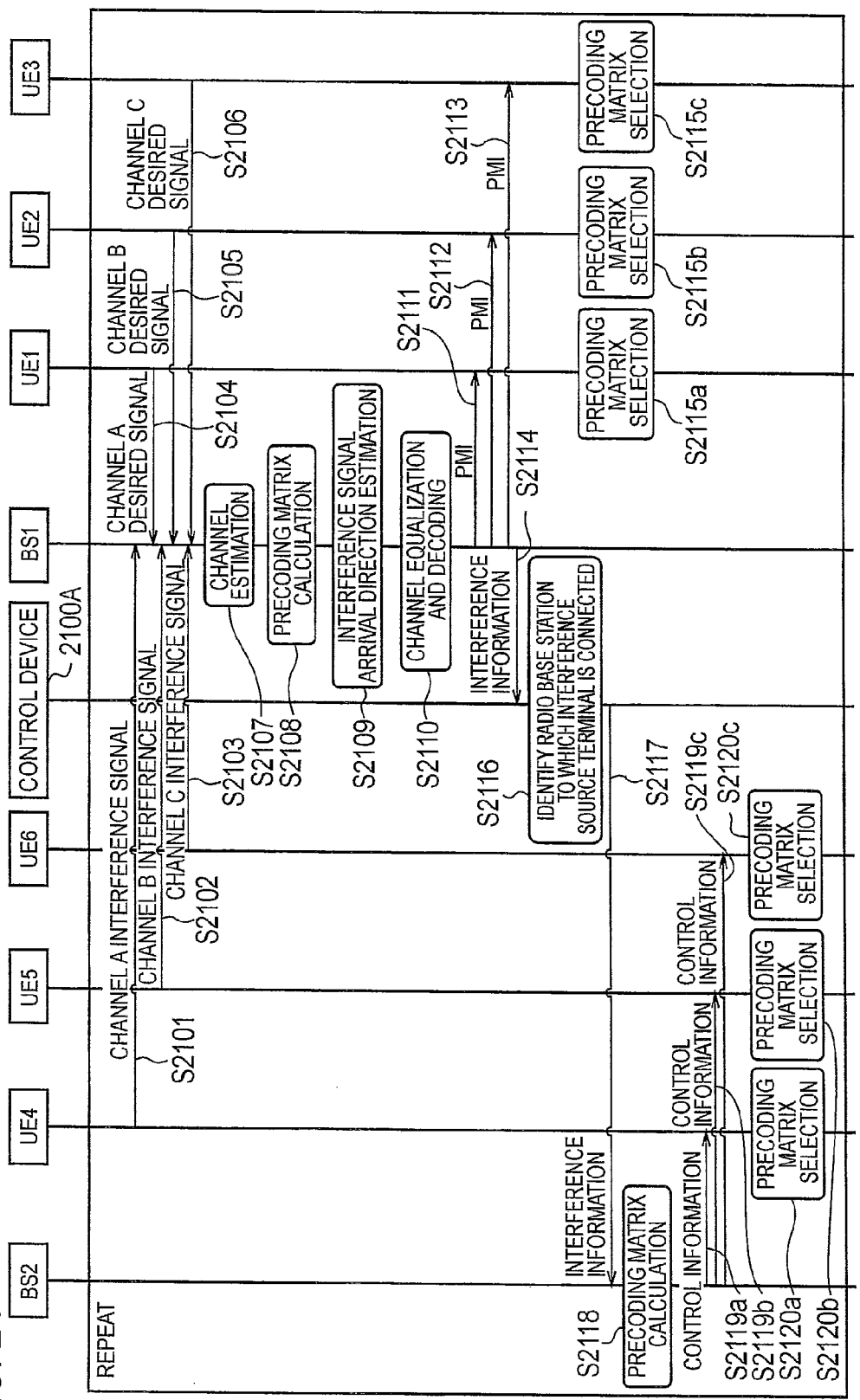
FIG. 24 is an operation sequence diagram showing an operation of the radio communication system according to the third embodiment of the present invention.

FIG. 24 is an operation sequence diagram showing an operation of the radio communication system 2010A. In FIG. 24, a description is given with illustration of only a PMI from the feedback information (RI, PMI, CQI) in accordance with the LTE standard. The operation sequence shown in FIG. 24 is repeatedly performed at predetermined time intervals (e.g., communication frame units).

In step S2101, the radio terminal UE4 transmits the second radio signal for which the channel A is used. In step S2104, the radio terminal UE1 transmits the first radio signal for which the channel A is used. The receiver 2211 of the radio base station BS1 receives as the desired signal the first radio signal for which the channel A is used and receives the second radio signal for which the channel A is used, as the interference signal interfering with the desired signal.

In step S2102, the radio terminal UE5 transmits the second radio signal for which the channel B is used. In step S2105, the radio terminal UE2 transmits the first radio signal for which the channel B is used. The receiver 2211 of the radio base station BS1 receives as the desired signal the first radio signal for which the channel B is used and receives the second radio signal for which the channel B is used, as the interference signal interfering with the desired signal.

In step S2103, the radio terminal UE6 transmits the second radio signal for which the channel C is used. In step S2106, the radio terminal UE3 transmits the first radio signal for which the channel C is used. The receiver 211 of the radio base station BS1 receives as the desired signal the first radio signal for which the channel C is used and receives the second radio signal for which the channel C is used, as the interference signal interfering with the desired signal.

In step S2107, the receiver 2211 of the radio base station BS1 performs channel estimation for estimating the channel response of the radio propagation channel for each of the radio terminals UE1 to UE3 on the basis of the pilot signal included in the first radio signal.

The identification information acquisition unit 2223 of the radio base station BS1 acquires in accordance with the aforementioned methods (a1) to (c1) the identification information from the second radio signal received by the receiver 2211 from each of the radio terminals UE1 to UE3.

In step S2108, the receiver 2211 of the radio base station BS1 calculates a precoding matrix on the basis of the estimated channel response and then acquires the PMI corresponding to the calculated precoding matrix.

In step S2109, the arrival direction estimation unit 2221 of the radio base station BS1 estimates the arrival direction D1 of the second radio signal to the radio base station BS1. The interference information generation unit 2222 of the radio base station BS1 generates the interference information on the basis of the arrival direction D1. Likewise, the arrival direction estimation unit 2221 estimates the arrival directions D2 and D3 of the second radio signals to the radio base station BS1. The interference information generation unit 2222 generates the interference information on the basis of the arrival directions D2 and D3.

Insteps S2110, the receivers 2211 of the radio base station BS1 equalize the reception signals (channel equalization) on the basis of the estimated channel response and then decode the equalized reception signals. The decoded reception signals are inputted to the controller 2220 of the radio base station BS1.

In step S2111, the transmitter 2212 of the radio base station BS1 transmits the PMI to the radio terminal UE1 as the feedback information. Likewise, the transmitter 2212 transmits the PMI to the radio terminal UE2 (step S2112) and then transmits the PMI to the radio terminal UE3 (step S2113).

In step S2115a, the radio terminal UE1 selects a precoding matrix corresponding to the PMI received from the radio base station BS1. When transmitting, next time, the first radio signal for which the channel A is used to the radio base station BS1, the radio terminal UE1 performs precoding using the selected precoding matrix.

In step S2115b, the radio terminal UE2 selects a precoding matrix corresponding to the PMI received from the radio base station BS1. When transmitting, next time, the first radio signal for which the channel B is used to the radio base station BS1, the radio terminal UE2 performs precoding using the selected precoding matrix.

In step S2115c, the radio terminal UE3 selects a precoding matrix corresponding to the PMI received from the radio base station BS1. When transmitting, next time, the first radio signal for which the channel C is used to the radio base station BS1, the radio terminal UE3 performs precoding using the selected precoding matrix.

In step S2114, the wired communication unit 2240 of the radio base station BS1 sends the control device 2100A the interference information generated by the interference information generation unit 2222 and the identification information acquired by the identification information acquisition unit 2223. The receiver 2111 of the control device 2100A receives the interference information and the identification information.

In step S2116, the base station identification unit 2121 of the control device 2100A identifies in accordance with the aforementioned methods (a2) to (c2) the radio base station BS2 to which an interference source terminal is connected, by use of the identification information received by the receiver 2111. The transmitter 2112 of the control device 2100A transmits the interference information and the identification information to the radio base station BS2 identified by the base station identification unit 2121. The wired communication unit 2340 of the radio base station BS2 receives the interference information and the identification information.

Meanwhile, the receiver 2311 of the radio base station BS2 calculates the precoding matrix for each of the radio terminals UE4 to UE6 connected to the radio base station BS2 and then acquires the PMI corresponding to the calculated precoding matrix.

In addition, the interference information acquisition unit 2321 of the radio base station BS2 acquires the interference information received by the wired communication unit 2340 from the control device 2100A. The terminal identification unit 2322 of the radio base station BS2 identifies in accordance with the aforementioned methods (a3) and (b3) an interference source terminal from among multiple radio terminals connected to the radio base station BS2 by use of the identification information received by the wired communication unit 2340 from the control device 2100A. Here, an assumption is made that the radio terminals UE4 to UE6 are identified as the interference source terminals.

In step S2119a, the transmitter 2312 of the radio base station BS2 transmits the PMI as the feedback information, and the control information to the radio terminal UE4. In step S2119b, the transmitter 2312 transmits the PMI as the feedback information, and the control information to the radio terminal UE5. In step S2119c, the transmitter 2312 transmits the PMI as the feedback information, and the control information to the radio terminal UE6. The receiver 2411 of each of the radio terminals UE4 to UE6 receives the PMI and the control information.

In step S2120a, the transmission directivity controller 2422 of the radio terminal UE4 controls the transmitter 2412 on the basis of the PMI and the control information received by the receiver 2411 in such a way that the directional beam are directed to the direction D4 of the radio base station BS2 while the null point is directed to the direction D1 of the radio base station BS1. To be more specific, the transmission directivity controller 2422 of the radio terminal UE4 selects a precoding matrix for directing the directional beam to the direction D4 of the radio base station BS2 in the precoding matrix group for directing the null point to the direction D1 of the radio base station BS1. When transmitting, next time, the second radio signal for which the channel A is used, the transmitter 2412 of the radio terminal UE4 performs precoding using the selected precoding matrix.

Likewise, in step S2120b, the transmission directivity controller 2422 of the radio terminal UE5 selects on the basis of the PMI and the control information received by the receiver 2411, a precoding matrix for directing the directional beam to the direction D5 of the radio base station BS2 in the precoding matrix group for directing the null point to the direction D2 of the radio base station BS1. When transmitting, next time, the second radio signal for which the channel B is used, the transmitter 2412 of the radio terminal UE5 performs precoding using the selected precoding matrix.

In step S2120b, the transmission directivity controller 2422 of the radio terminal UE6 selects on the basis of the PMI and the control information received by the receiver 2411, a precoding matrix for directing the directional beam to the direction D6 of the radio base station BS2 in the precoding matrix group for directing the null point to the direction D3 of the radio base station BS1. When transmitting, next time, the second radio signal for which the channel C is used, the transmitter 2412 of the radio terminal UE6 performs precoding using the selected precoding matrix.

(5) Effects

With the radio communication system 2010A according to the third embodiment, in a case where the radio base station BS1 receives the second radio signals from the radio terminals UE4 to UE6 as the interference signals, the null points in the radio terminals UE4 to UE6 are directed to the directions D1 to D3 of the radio base station BS1, respectively. Thus, the radio base station BS1 can avoid receiving the second radio signals (interference signals), and the communication quality can be improved sufficiently in the radio base station BS1. As described, the prevention of occurrence of the interference signals in the source makes it possible to provide high-speed downlink communications to each of the radio terminals while increasing the cell throughput.

In the third embodiment, the transmission directivity controllers 2422 of the radio terminals UE4 to UE6 direct the null points to the directions D1 to D3 of the radio base station BS1 while directing the directional beam to the directions D4 to D6 of the radio base station BS2 on the basis of the PMIs and the control information from the radio base station BS2. Accordingly, the communication quality is improved sufficiently in the radio base station BS1 while the communication quality in the radio base station BS2 can be kept in a good condition.

In the third embodiment, the base station identification unit 2121 of the control device 2100A identifies in accordance with the aforementioned methods (a2) to (c2), the radio base station BS2 to which an interference source terminal is connected. Accordingly, even if there are multiple radio base stations that are candidates for the radio base station to which the interference source terminal is connected, the radio base station to which the interference source terminal is connected can be identified easily, and the interference information can be transmitted to the appropriate radio base station.

In the third embodiment, the terminal identification unit 2322 of the radio base station BS2 identifies the interference source terminal in accordance with the aforementioned methods (a3) and (b3). Accordingly, even if there are multiple candidates for the interference source terminal, the interference source terminal can be identified easily, and the control information can be transmitted to the appropriate radio terminal.

[Modification Example 1 of Third Embodiment]

In the aforementioned third embodiment, the control information acquisition unit 2421 of each of the radio terminals UE4 to UE6 acquires the information on the coefficient or angle indicating the arrival direction, or the PMI from the radio base station BS2 as the interference information and the control information.

However, information indicating the location of the radio base station BS1 may be used as the interference information and the control information because an approximate direction of the radio base station BS1 can be identified from the location of the radio base station BS1. It is also possible to previously store the location information of the radio base station BS1 in the radio base station BS1 or the control device 2100A because the installation location of the radio base station BS1 is fixed.

In a case where the location information of the radio base station BS1 is used as the interference information and the control information, the transmission directivity controllers 2422 of the radio terminals UE4 to UE6 may identify the direction of the radio base station BS1 from the location of the radio base station BS1.

In order to more accurately identify the direction of the radio base station BS1, the control information acquisition units 2421 may further acquire the location information of the respective radio terminals UE4 to UE6 by use of GPSes or the like respectively provided in the radio terminals UE4 to UE6. The detailed direction of the radio base station BS1 can be identified from the respective locations of the radio terminals UE4 to UE6 and the location of the radio base station BS1.

[Modification Example 2 of Third Embodiment]

In the aforementioned third embodiment, the control information acquisition unit 2421 of each of the radio terminals UE4 to UE6 acquires the information on the coefficient or angle indicating the arrival direction, or the PMI from the radio base station BS2 as the interference information and the control information. However, the control information may be acquired by use of a different method.

To be more specific, in a case where the radio terminals UE4 to UE6 receive downlink radio signals from the radio base station BS1, the control information acquisition units 2421 estimate the arrival directions of the downlink radio signals and then acquire the information indicating the estimated arrival directions as the control information. In this case, the transmission directivity controllers 2422 of the radio terminals UE4 to UE6 may identify the directions of the radio base station BS1 from the arrival directions of the downlink radio signals.

[Fourth Embodiment]

In the aforementioned fourth embodiment, the control device 2100A is provided separately from the radio base station BS1 and the radio base station BS2. In a fourth embodiment, a description is given of a case where the control device 2100A is included in the radio base station BS1.

Note that, a description is given of (1) Configuration of Radio Communication System, (2) Operation of Radio Communication System and (3) Effects in the fourth embodiment.

(1) Configuration of Radio Communication System

Figure 25:
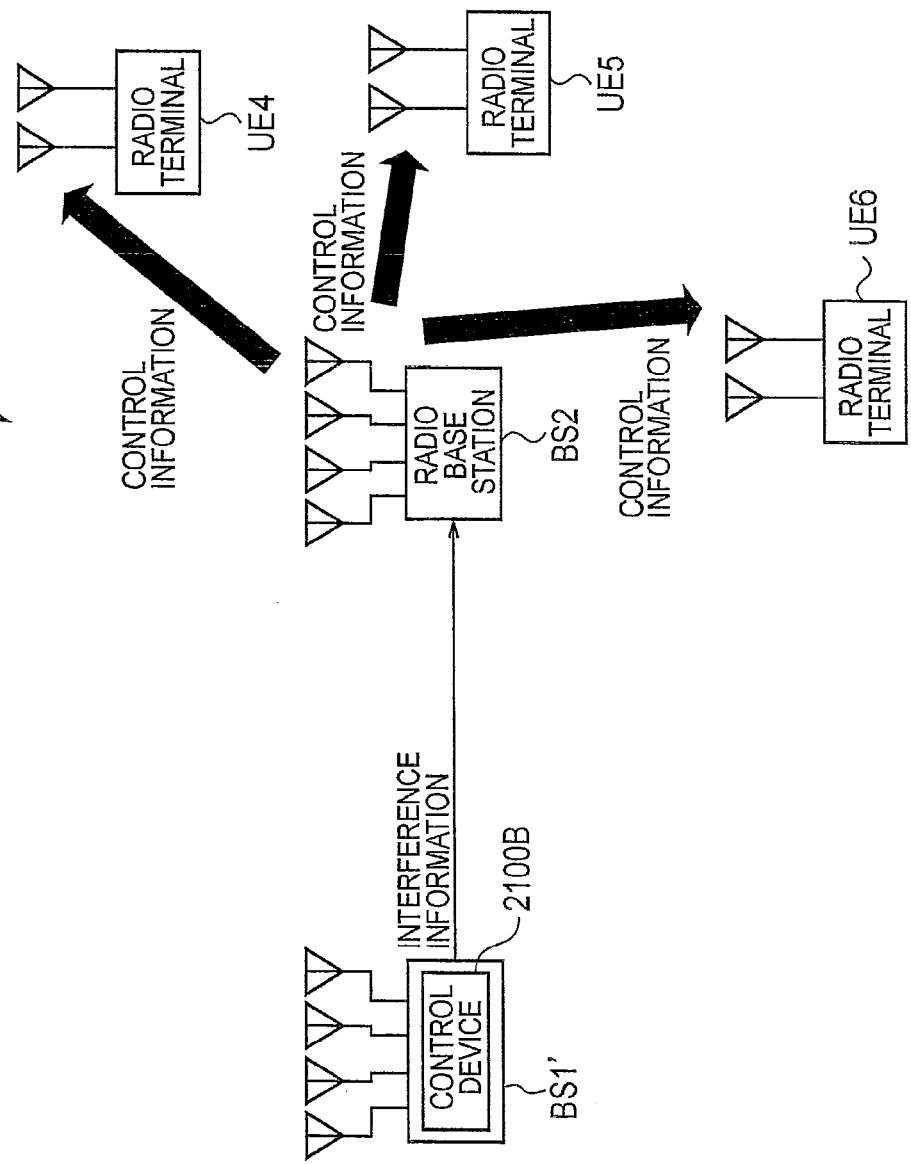
FIG. 25 is an overall configuration diagram of a radio communication system according to a fourth embodiment of the present invention.

FIG. 25 is an overall configuration diagram of the radio communication system 2010B according to the fourth embodiment.

Figure 26:
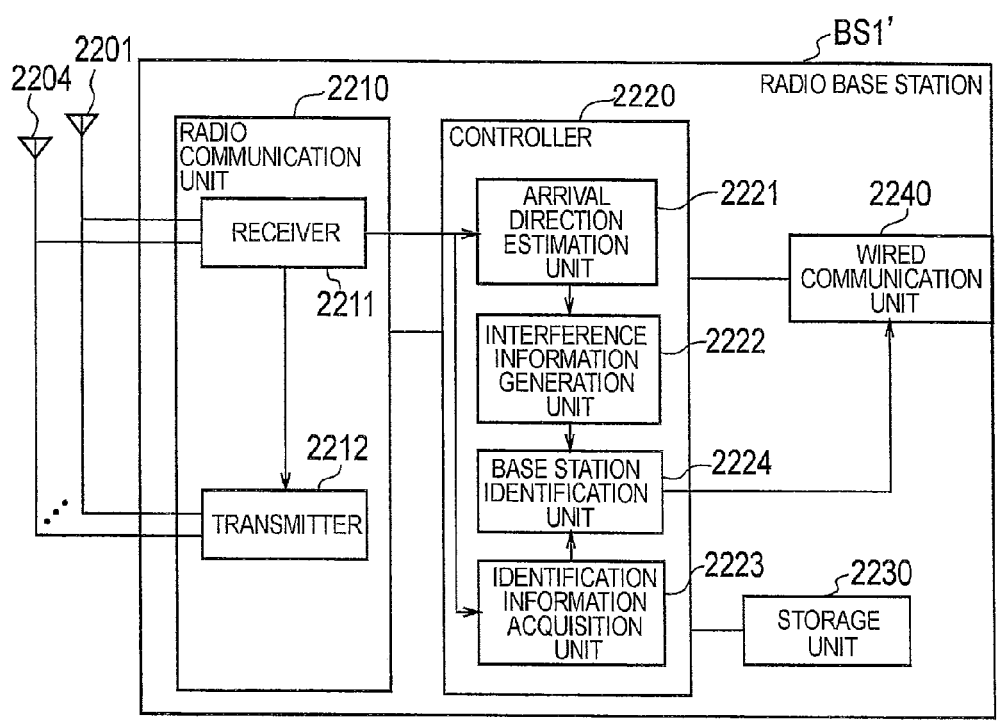
FIG. 26 is a functional block diagram showing a configuration of a radio base station (first radio base station) according to the fourth embodiment of the present invention.

As shown in FIG. 25, a radio base station BS1' has functions of a control device 2100B in the radio communication system 2010B. To put it more specifically, as shown in FIG. 26, a controller 2220 of the radio base station BS1' has a base station identification unit 2224 configured to identify a radio base station to which an interference source terminal is connected. The functions of the base station identification unit 2224 are the same as the functions of the base station identification unit 2121 described in the third embodiment.

(2) Operation of Radio Communication System

Figure 27:
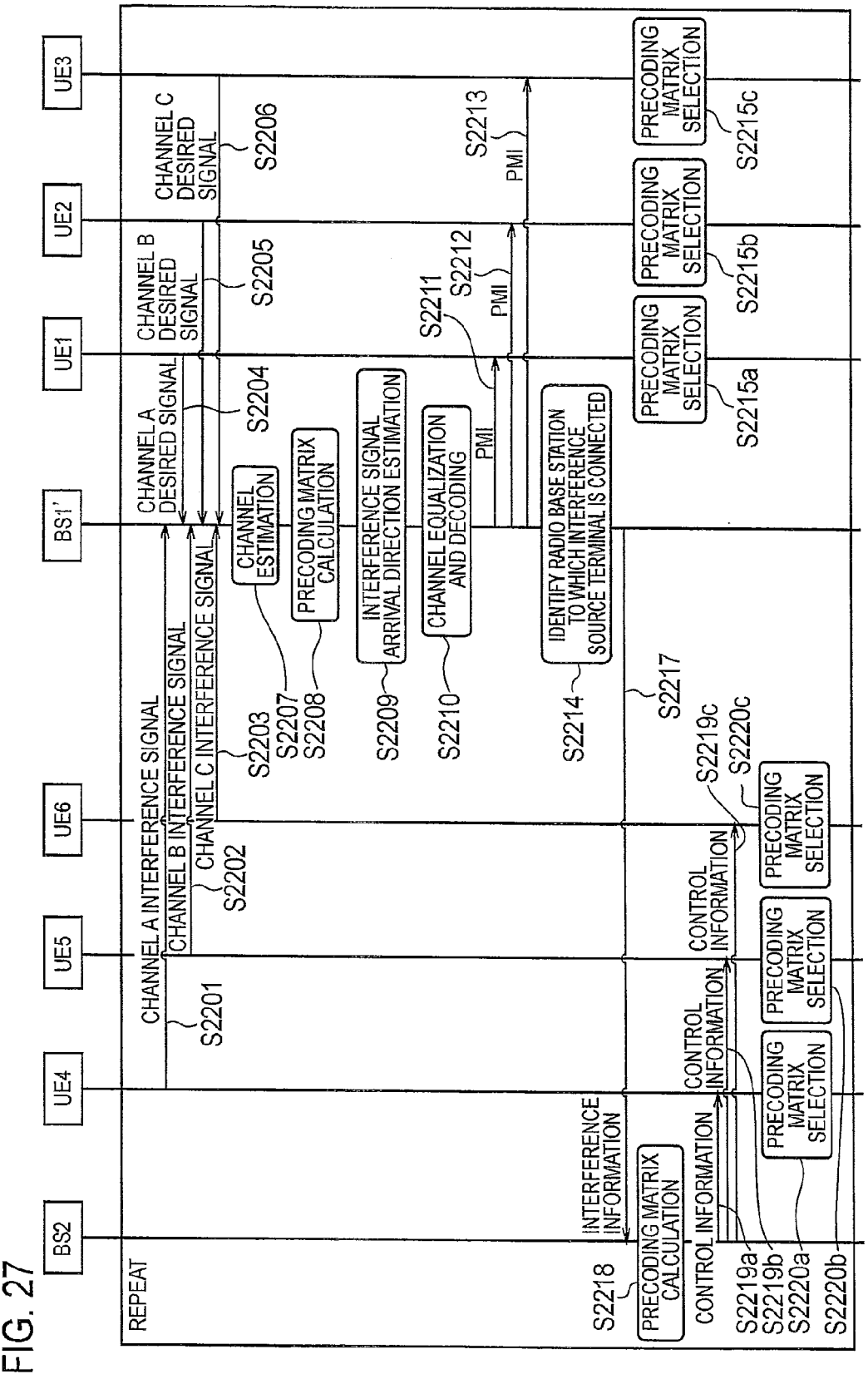
FIG. 27 is an operation sequence diagram showing an operation of the radio communication system according to the fourth embodiment of the present invention.

FIG. 27 is an operation sequence diagram showing an operation of the radio communication system 2010B. In FIG. 27, each processing until step S2213 and each processing in step S2218 and thereafter are the same as the processing in the third embodiment. Thus, processing in step S2214 and S2217 will be described.

In step S2214, the base station identification unit 2224 of the radio base station BS1' identifies in accordance with the aforementioned methods (a2) to (c2) the radio base station BS2 to which the interference source terminal is connected, by use of the identification information.

In step S2217, a wired communication unit 2240 of the radio base station BS1' transmits the interference information and the control information to the radio base station BS2 identified by the base station identification unit 2224. A wired communication unit 2340 of the radio base station BS2 receives the interference information and the control information.

(3) Effects

The radio communication system 2010B according to the fourth embodiment can produce the following effect in addition to the effects obtained in the fourth embodiment. Specifically, since the control device 2100B does not have to be provided separately, the installation cost of the control device 2100B can be reduced.

[Other Embodiments According to Third and Fourth Embodiments]

Each of the modification examples 1 to 3 of the third embodiment is applicable not only to the third embodiment but also the fourth embodiment.

In the aforementioned third and fourth embodiments, when the radio base station BS1 receives a second radio signal, the second radio signal is considered as an interference signal, but a second radio signal having a reception level less than a predetermined reception level may be tolerated. In this case, when the radio base station BS1 receives a second radio signal, and the reception level of the second radio signal is equal to or greater than the predetermined reception level, the second radio signal is considered as an interference signal.

In the third and fourth embodiments, the FDD scheme is employed as a duplex scheme, but a time division duplex (TDD) scheme may be employed instead of the FDD scheme.

In the third and fourth embodiments, the configuration in which two transmission antennas and four reception antennas are provided (2×4 MIMO) in uplink communications is described. However, a configuration in which a single reception antenna is provided in the uplink communications, i.e., a configuration in which multiple-antenna transmission of multiple-input single-output (MISO) is performed may be employed as well.

In the third and fourth embodiments, multiple radio terminals are connected to each of the radio base stations BS1 and BS2, but a configuration in which a single radio terminal is connected to each of the radio base stations BS1 and BS2 may be employed as well.

In the third and fourth embodiments, the radio communication systems 2010A and 2010B based on the LTE standard are described, but the present invention is not only applicable to the radio communication systems based on the LTE standard but also to a radio communication system based the WiMAX standard (IEEE. 802.16) or the UMB (Ultra Mobile Broadband) standard, which is standardized in 3GPP2, or the like.

Note that the entire contents of Japanese Patent Application No. 2009-12326 (filed on Jan. 22, 2009) and Japanese Patent Application No. 2009-17397 (filed on Jan. 28, 2009) are incorporated herein by reference.

Industrial Applicability

As described above, the present invention solves the interference problem in radio communications. Thus, the present invention is useful in radio communications such as mobile communications.

The invention claimed is:

1. A radio communication system comprising:
a first radio terminal;
a first radio apparatus that is capable of transmitting a first radio signal, by use of a predetermined radio resource, to the first radio terminal via a plurality of first transmission antennas;
a second radio apparatus that is capable of transmitting a second radio signal to a second radio terminal via a plurality of second transmission antennas, by use of the predetermined radio resource, wherein
the first radio terminal receiving the second radio signal from the second radio apparatus transmits, to the first radio apparatus, interference information based on the second radio signal and being for directing, toward the first radio terminal, a null point of a directional beam formed by the second radio apparatus.

2. The radio communication system according to claim 1, wherein the second radio apparatus transmits the second radio signal while directing the null point toward the first radio terminal and also directing the directional beam toward the second radio terminal on the basis of the interference information and feedback information fed back from the second radio terminal receiving the second radio signal.

3. The radio communication system according to claim 1, comprising:
a control device that controls the first radio apparatus and the second radio apparatus, wherein
the control device is included in the first radio apparatus.

4. The radio communication system according to claim 1, comprising:
a control device that controls the first radio apparatus and the second radio apparatus, wherein
the control device is provided separately from the first radio apparatus and the second radio apparatus.

5. The radio communication system according to claim 1, comprising:
a control device that controls the first radio apparatus and the second radio apparatus, wherein
the first radio terminal transmits, to the first radio apparatus, apparatus identification information for identifying the second radio apparatus on the basis of the second radio signal, and
the control device identifies the second radio apparatus from among a plurality of radio apparatuses on the basis of the apparatus identification information received by the first radio apparatus, and
the control device transmits the interference information to the identified second radio apparatus.

6. The radio communication system according to claim 1, comprising:
a control device that controls the first radio apparatus and the second radio apparatus, wherein
the control device previously holds therein correspondence information associating the interference information with the second radio apparatus,
the control device identifies the second radio apparatus from among a plurality of radio apparatuses on the basis of the interference information received by the first radio apparatus, and the correspondence information held therein, and
the control device transmits the interference information to the identified second radio apparatus.

7. The radio communication system according to claim 1, wherein the interference information is information indicating the arrival direction estimated by the first radio terminal, or information for identifying a transmission antenna weight for directing the null point toward the first radio terminal.

8. The radio communication system according to claim 1, wherein the control information is information indicating the arrival direction estimated by the first radio apparatus, or information for identifying a transmission antenna weight for directing the null point toward the first radio apparatus.

9. A radio terminal comprising:
a receiver that is capable of receiving a first radio signal which a first radio apparatus transmits via a plurality of first transmission antennas by use of a predetermined radio resource and a second signal which a second radio apparatus transmits via a plurality of second transmission antennas by use of the predetermined radio resource; and
a transmitter that is capable of transmitting, to the first radio apparatus, interference information d on the second radio signal and being for directing, toward the radio terminal, a null point of a directional beam formed by the second radio apparatus.

10. A control device that controls:
a first radio apparatus that is capable of transmitting a first radio signal, by use of a predetermined radio resource, to a first radio terminal via a plurality of first transmission antennas; and
a second radio apparatus that is capable of transmitting a second radio signal, by use of the predetermined radio resource, to a second radio terminal via a plurality of second transmission antennas,
the control device comprising a transmitter that transmits interference information to the second radio apparatus, if the first radio apparatus receives the interference information from the first radio terminal, the interference information based on the second radio signal and being for directing, toward the first radio terminal, a null point of a directional beam formed by the second radio apparatus.

11. A radio communication method comprising the steps of:
transmitting, from a first radio apparatus to a first radio terminal via a plurality of first transmission antennas, a first radio signal by use of a predetermined radio resource;
transmitting, from a second radio apparatus to a second radio terminal via a plurality of second transmission antennas, a second radio signal by use of the predetermined radio resource;
transmitting, from the first radio terminal to the first radio apparatus, interference information d on the second radio signal and being for directing, toward the first radio terminal, a null point of a directional beam formed by the second radio apparatus.

12. A radio communication system comprising:
a first radio apparatus that is capable of receiving a first radio signal, transmitted by use of a predetermined radio resource, from a first radio terminal having a plurality of first transmission antennas; and
a second radio apparatus that is capable of receiving a second radio signal, transmitted by use of the predetermined radio resource, from a second radio terminal having a plurality of second transmission antennas,
wherein
the second radio apparatus transmits control information based on interference information to the second radio terminal if the second radio apparatus receives the interference information d on an arrival direction of the second radio signal to the first radio apparatus from the first radio apparatus, the control information being for directing, toward the first radio apparatus, a null point of a directional beam formed by the second radio terminal.

13. The radio communication system according to claim 12, wherein the second radio terminal transmits the second radio signal while directing the null point toward the first radio apparatus and also directing the directional beam toward the second radio apparatus on the basis of the control information received from the second radio apparatus and feedback information fed back from second radio apparatus.

14. The radio communication system according to claim 12, comprising:
a control device that controls the first radio apparatus and the second radio apparatus, wherein the control device includes:
an apparatus identification unit that identifies the second radio apparatus from among a plurality of radio apparatuses including the second radio apparatus, on the basis of information on the second radio signal; and
an interference information transmitter that transmits the interference information to the second radio apparatus identified by the apparatus identification unit.

15. The radio communication system according to claim 14, comprising:
a control device that controls the first radio apparatus and the second radio apparatus, wherein
the control device includes a storage unit that stores therein connection information in which terminal identification information for identifying a radio terminal connected to any of the plurality of radio apparatuses is associated with the radio apparatus to which the radio terminal is connected,
the second radio signal includes terminal identification information for identifying the second radio terminal, and
the apparatus identification unit identifies the second radio apparatus from among the plurality of radio apparatuses on the basis of the connection information stored in the storage unit and the terminal identification information included in the second radio signal.

16. The radio communication system according to claim 15, comprising:
a control device that controls the first radio apparatus and the second radio apparatus, wherein
the interference information transmitter transmits the terminal identification information included in the second radio signal to the second radio apparatus in addition to the interference information, and
the second radio apparatus includes:
a terminal identification unit that identifies the second radio terminal on the basis of the terminal identification information received from the control device, from among a plurality of radio terminals connected to the second radio apparatus; and
a control information transmitter that transmits the control information to the second radio terminal identified by the terminal identification unit.

17. The radio communication system according to claim 14, comprising:
a control device that controls the first radio apparatus and the second radio apparatus, wherein
the control device includes a storage unit that stores therein channel information in which channel identification information for identifying a communication channel used in uplink communications by a radio terminal connected to any of the plurality of radio apparatuses is associated with the radio apparatus to which the radio terminal is connected, and
the apparatus identification unit identifies the second radio apparatus from among the plurality of radio apparatuses on the basis of the channel information stored in the storage unit and the channel identification information for identifying the predetermined communication channel.

18. The radio communication system according to claim 17, comprising:
a control device that controls the first radio apparatus and the second radio apparatus, wherein
the interference information transmitter transmits, to the second radio apparatus, the channel identification information for identifying the predetermined communication channel in addition to the interference information,
the second radio apparatus includes:
a terminal identification unit that identifies the second radio terminal on the basis of the channel identification information received from the control device from among a plurality of radio terminals connected to the second radio apparatus; and
a control information transmitter that transmits the control information to the second radio terminal identified by the terminal identification unit.

19. The radio communication system according to claim 14, wherein
the second radio signal includes a signal sequence specific to the second radio apparatus, and
the apparatus identification unit identifies the second radio apparatus from among the plurality of radio apparatuses on the basis of the signal sequence included in the second radio signal.

20. The radio communication system according to claim 12, wherein the interference information is information indicating the arrival direction estimated by the first radio apparatus, or information for identifying a transmission antenna weight for directing the null point toward the first radio apparatus.

21. The radio communication system according to claim 12, comprising:
a control device that controls the first radio apparatus and the second radio apparatus, wherein
the control device is included in the first radio apparatus or is provided separately from the first radio apparatus and the second radio apparatus.

22. A radio apparatus comprising:
a receiver that is capable of receiving a first radio signal, which is transmitted by use of a predetermined radio resource, from a first radio terminal having a plurality of transmission antennas; and
a transmitter that is capable of transmitting interference information to the radio apparatus, the interference information d on an arrival direction of a second radio signal, which is transmitted by use of the predetermined radio resource, from a second radio terminal connected to a different radio apparatus, wherein
the interference information is used for transmitting control information to the second radio terminal from the different radio apparatus, the control information being for directing, toward the radio apparatus, a null point of a directional beam formed by the second radio terminal.

23. A radio apparatus comprising:
a receiver that is capable of receiving a second radio signal, which is transmitted by use of a predetermined radio resource, from a second radio terminal having a plurality of second transmission antennas;
an interference information acquisition unit configured to acquire interference information d on an arrival direction of the radio signal to a different radio apparatus from either the different radio apparatus or a control device configured to control the radio apparatus and the different radio apparatus; and
a transmitter that transmits control information to the second radio terminal on a basis of interference information based on an arrival direction of the second radio signal to a different radio apparatus if the radio apparatus receives the interference information from the different radio apparatus being capable of receiving a first radio signal, which is transmitted by use of the predetermined radio resource, from a first radio terminal having a plurality of first transmission antennas, wherein,
the control information is for directing, toward the different radio apparatus, a null point of a directional beam formed by the second radio terminal.

24. A control device configured to control:
a first radio apparatus that is capable of receiving a first radio signal, which is transmitted by use of a predetermined radio resource, from a first radio terminal having a plurality of first transmission antennas; and
a second radio apparatus that is capable of receiving a second radio signal, which is transmitted by use of the predetermined radio resource, from a second radio terminal having a plurality of second transmission antennas, the control device comprising:
a apparatus identification unit configured to identify the second radio apparatus on the basis of information on the second radio signal from a plurality of radio apparatuses including the second radio apparatus if the first radio apparatus receives the second radio signal from the second radio terminal; and
a transmitter transmits interference information to the second radio apparatus if the control device receives the interference information from the first radio apparatus, the interference information being based on an arrival direction of the second radio signal to the first radio apparatus, wherein
the interference information is used for transmitting control information to the second radio terminal from the second radio apparatus, the control information being for directing, toward the first radio apparatus, a null point of a directional beam formed by the second radio terminal.

25. A radio communication method comprising the steps of:
receiving by a first radio apparatus a first radio signal, which is transmitted by use of a predetermined radio resource, from a first radio terminal having a plurality of first transmission antennas;
receiving by a second radio apparatus a second radio signal, which is transmitted by use of the predetermined radio resource, from a second radio terminal having a plurality of second transmission antennas;
generating interference information based on an arrival direction of the second radio signal to the first radio apparatus if the first radio apparatus receives the second radio signal from the second radio terminal;
transmitting by a control device the interference information generated by the first radio apparatus to the second radio apparatus, the control device being configured to control the first radio apparatus and the second radio apparatus; and transmitting, from the second radio apparatus to the second radio terminal, control information based on interference information based on an arrival direction of the second radio signal to the first radio apparatus if the second radio apparatus receives the interference information from the first radio apparatus, the control information being for directing, toward the first radio apparatus, a null pint of a directional beam formed by the second radio terminal.

* * * * *